United States Patent
Enomoto et al.

(10) Patent No.: US 9,649,909 B2
(45) Date of Patent: May 16, 2017

(54) VEHICLE HEAT MANAGEMENT SYSTEM INCLUDING A SWITCHING VALVE

(71) Applicant: DENSO CORPORATION, Kariya, Aichi-pref. (JP)

(72) Inventors: Norihiko Enomoto, Nagoya (JP); Nobuharu Kakehashi, Toyoake (JP); Michio Nishikawa, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 228 days.

(21) Appl. No.: 14/408,854

(22) PCT Filed: May 21, 2013

(86) PCT No.: PCT/JP2013/003217
§ 371 (c)(1),
(2) Date: Dec. 17, 2014

(87) PCT Pub. No.: WO2013/190767
PCT Pub. Date: Dec. 27, 2013

(65) Prior Publication Data
US 2015/0273976 A1 Oct. 1, 2015

(30) Foreign Application Priority Data
Jun. 20, 2012 (JP) ................. 2012-138432

(51) Int. Cl.
*B60H 1/00* (2006.01)
*B60K 6/22* (2007.10)
(Continued)

(52) U.S. Cl.
CPC ......... *B60H 1/00278* (2013.01); *B60H 1/004* (2013.01); *B60H 1/08* (2013.01);
(Continued)

(58) Field of Classification Search
CPC ........ B60H 1/00278; B60H 1/08; B60H 1/22; B60H 1/004; B60K 6/22; B60W 10/30; B60W 20/00; B60L 3/0023; B60L 3/0046
See application file for complete search history.

(56) References Cited

U.S. PATENT DOCUMENTS 4,503,673 A * 3/1985 Schachle ............ F03D 7/04
290/44
5,660,722 A * 8/1997 Nederlof ............ A61M 1/3413
210/321.65
(Continued)

FOREIGN PATENT DOCUMENTS

JP  H11200858 A  7/1999
JP  2003262127 A  9/2003
(Continued)

OTHER PUBLICATIONS

Office Action dated May 19, 2015 in corresponding Japanese Application No. 2012-138432.
(Continued)

*Primary Examiner* — Ljiljana Ciric
(74) *Attorney, Agent, or Firm* — Harness, Dickey & Pierce, P.L.C.

(57) ABSTRACT

A first heat transfer medium circuit includes a first path and a second heat transfer medium circuit includes a second path are formed independently from each other by operating a first switching valve and a second switching valve in conjunction with each other to make each of multiple flow passages of a first flow passage group communicate with either the first path or the second path. The first and second heat transfer medium circuits in which the first path and the second path are connected to each other in series is formed by operating the first switching valve and the second switching valve in conjunction with each other to make each of the (Continued)

multiple flow passages of the first flow passage group communicate with both the first path and the second path.

26 Claims, 29 Drawing Sheets

(51) Int. Cl.
| | |
|---|---|
| *B60H 1/08* | (2006.01) |
| *B60H 1/22* | (2006.01) |
| *B60W 10/30* | (2006.01) |
| *B60W 20/00* | (2016.01) |
| *B60L 1/02* | (2006.01) |
| *B60L 3/00* | (2006.01) |
| *B60L 11/12* | (2006.01) |
| *B60L 11/18* | (2006.01) |
| B60K 11/02 | (2006.01) |
| F01P 7/16 | (2006.01) |
| F01P 5/10 | (2006.01) |
| B60K 1/04 | (2006.01) |
| B60K 1/00 | (2006.01) |

(52) U.S. Cl.
CPC ............... *B60H 1/22* (2013.01); *B60K 6/22* (2013.01); *B60L 1/02* (2013.01); *B60L 3/0023* (2013.01); *B60L 3/0046* (2013.01); *B60L 3/0061* (2013.01); *B60L 11/12* (2013.01); *B60L 11/1874* (2013.01); *B60L 11/1875* (2013.01); *B60W 10/30* (2013.01); *B60W 20/00* (2013.01); *B60H 2001/00307* (2013.01); *B60K 1/04* (2013.01); *B60K 11/02* (2013.01); *B60K 2001/005* (2013.01); *B60L 2240/36* (2013.01); *B60L 2240/425* (2013.01); *B60L 2240/445* (2013.01); *B60L 2240/545* (2013.01); *B60L 2240/662* (2013.01); *B60L 2260/44* (2013.01); *B60L 2260/56* (2013.01); *F01P 7/165* (2013.01); *F01P 2005/105* (2013.01); *F01P 2050/24* (2013.01); *F01P 2060/04* (2013.01); *F01P 2060/12* (2013.01); *Y02T 10/642* (2013.01); *Y02T 10/7005* (2013.01); *Y02T 10/705* (2013.01); *Y02T 10/7077* (2013.01); *Y02T 10/7291* (2013.01); *Y02T 90/16* (2013.01)

(56) References Cited

U.S. PATENT DOCUMENTS

| | | | | |
|---|---|---|---|---|
| 5,695,720 | A | * 12/1997 | Wade | .................. G01N 35/085 356/36 |
| 2003/0127528 | A1 | 7/2003 | Sabhapathy et al. | |
| 2009/0124963 | A1* | 5/2009 | Hogard | ................... A61M 1/16 604/30 |
| 2011/0296855 | A1 | 12/2011 | Johnston et al. | |
| 2012/0180997 | A1 | 7/2012 | Johnston et al. | |
| 2012/0183815 | A1 | 7/2012 | Johnston et al. | |
| 2013/0111893 | A1* | 5/2013 | Edward | ............... B60K 7/0015 60/468 |
| 2014/0217029 | A1* | 8/2014 | Meyer | ................. A61M 1/3465 210/647 |
| 2014/0374081 | A1* | 12/2014 | Kakehashi | ............. B60K 11/02 165/202 |
| 2015/0000327 | A1* | 1/2015 | Kakehashi | .............. F25D 17/02 62/434 |
| 2015/0101789 | A1* | 4/2015 | Enomoto | ........... B60H 1/00485 165/202 |
| 2015/0204595 | A1* | 7/2015 | Sunderland | ........... F25B 25/005 165/295 |
| 2016/0031288 | A1* | 2/2016 | Nishikawa | ................ F01P 3/20 165/202 |
| 2016/0031291 | A1* | 2/2016 | Enomoto | ........... B60H 1/00385 62/179 |
| 2016/0297284 | A1* | 10/2016 | Miyakoshi | ......... B60H 1/00392 |
| 2016/0361967 | A1* | 12/2016 | Gawthrop | ............. B60H 1/004 |

FOREIGN PATENT DOCUMENTS

| | | |
|---|---|---|
| JP | 2004-076603 | 3/2004 |
| JP | 2004076603 A | 3/2004 |
| JP | 2004268751 A | 9/2004 |
| JP | 2010272289 A | 12/2010 |
| JP | 2011255879 A | 12/2011 |

OTHER PUBLICATIONS

International Search Report and Written Opinion (in Japanese with English Translation) for PCT/JP2013/003217, mailed Aug. 27, 2013; ISA/JP.

* cited by examiner

VEHICLE HEAT MANAGEMENT SYSTEM INCLUDING A SWITCHING VALVE

CROSS REFERENCE TO RELATED APPLICATIONS

This application is a U.S. National Phase Application under 35 U.S.C. 371 of International Application No. PCT/JP2013/003217 filed on May 21, 2013 and published in Japanese as WO 2013/190767 A1 on Dec. 27, 2013. This application is based on and claims the benefit of priority from Japanese Patent Application No. 2012-138432 filed on Jun. 20, 2012. The entire disclosures of all of the above applications are incorporated herein by reference.

TECHNICAL FIELD

The present disclosure relates to a heat management system that is used in a vehicle.

BACKGROUND ART

In the past, Patent Document 1 disclosed a cooling device for a hybrid electric vehicle that includes an engine cooling system of which the target coolant temperature is high, a motor cooling system of which the target coolant temperature is medium, and a battery cooling system of which the target coolant temperature is low.

In this related art, a water pump is disposed in each of the engine cooling system, the motor cooling system, and the battery cooling system, an engine is disposed in the engine cooling system, and an electric motor and a heat storage device are disposed in the motor cooling system.

Further, in this related art, the engine cooling system and the motor cooling system are connected to each other through a coolant pipe and a three-way valve, and the engine cooling system and the motor cooling system can be disconnected from each other or connected to each other.

For example, a motor generator, an inverter, a battery, an EGR cooler, an intake air cooler, and the like are present as heat exchange devices, which are mounted on the vehicle, in addition to the engine, the electric motor, and the heat storage device. Required control temperatures of these heat exchange devices are different from each other.

PRIOR ART DOCUMENT

Patent Document

Patent Document 1: JP 11-200858 A

SUMMARY OF THE INVENTION

According to the examination of an inventor of this disclosure, for the appropriate management of the temperatures of those heat exchange target devices in the above-mentioned related art, the number of cooling systems is increased according to the number of the heat exchange target devices, and the number of three-way valves, which are used to disconnect or connect the respective cooling systems, is also increased accordingly. For this reason, there is a concern that the entire configuration may become very complicated.

An object of the present disclosure is to simplify the configuration of a vehicle heat management system capable of switching between a case in which each of multiple paths forms an independent heat transfer medium circuit and a case in which the multiple paths are connected to form a heat transfer medium circuit.

According to an aspect of the present disclosure, a vehicle heat management system includes a first pump and a second pump that suck a heat transfer medium and discharge the heat transfer medium, a first path in which the heat transfer medium flows and the first pump is disposed, a second path in which the heat transfer medium flows and the second pump is disposed, a first flow passage group that includes flow passages in which the heat transfer medium flows, a first switching valve to which an inlet side of the first path and an inlet side of the second path are connected in parallel and to which outlet sides of the flow passages of the first flow passage group are connected in parallel, wherein the first switching valve switches communication states of the flow passages of the first flow passage group individually between a state communicating with the first path and a state communicating with the second path, and a second switching valve to which an outlet side of the first path and an outlet side of the second path are connected in parallel and to which inlet sides of the flow passages of the first flow passage group are connected in parallel, wherein the second switching valve switches communication states of the flow passages of the first flow passage group individually between a state communicating with the first path and a state communicating with the second path. The first switching valve and the second switching valve operate in conjunction with each other. When a first predetermined condition is satisfied, each of the flow passages of the first flow passage group communicates with either the first path or the second path to provide a heat transfer medium circuit including the first path and a heat transfer medium circuit including the second path which are independent from each other. When a second predetermined condition is satisfied, each of the flow passages of the first flow passage group communicates with both the first path and the second path to provide a heat transfer medium circuit in which the first path communicates with the second path in series.

Accordingly, a state in which each of multiple paths forms an independent heat transfer medium circuit and a state in which the multiple paths are connected to form a heat transfer medium circuit can be switched therebetween by a simple configuration in which the multiple paths are connected to the flow passage groups by the switching valves (see FIGS. 7 to 10 to be described below).

EMBODIMENTS FOR EXPLOITATION OF THE INVENTION

Figure 1:
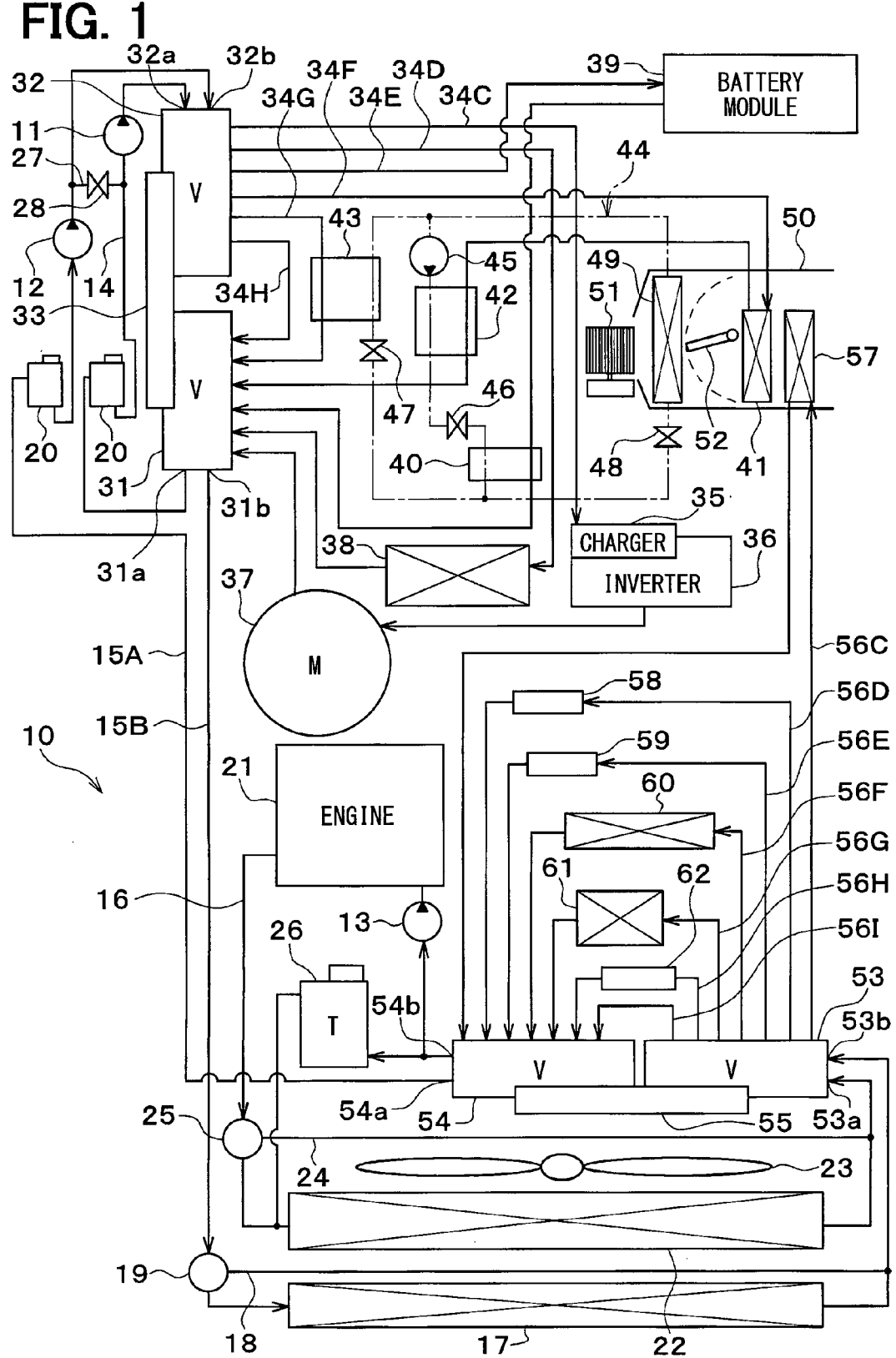
FIG. 1 is a schematic diagram of a vehicle heat management system according to a first embodiment.
Figure 2:
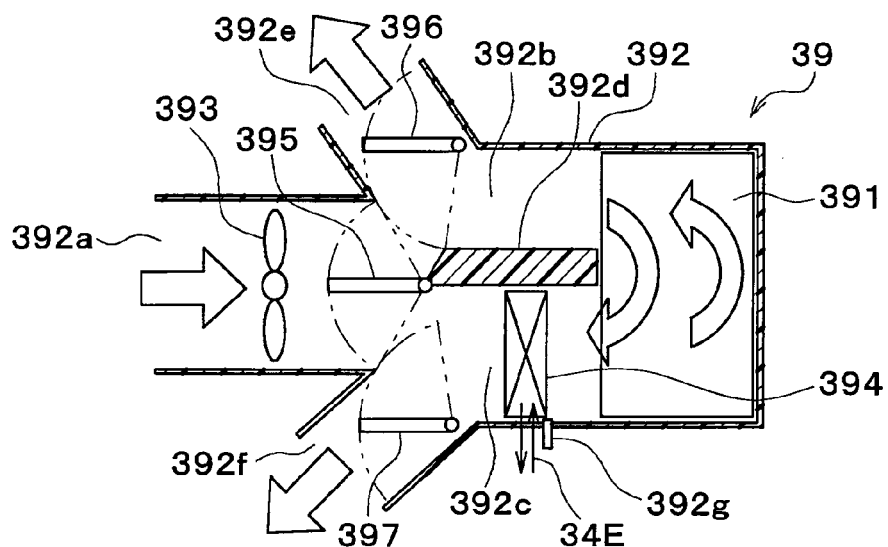
FIG. 2 is a schematic cross-sectional view of a battery module of the first embodiment.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment will be described below with reference to FIGS. 1 to 10. A vehicle heat management system 10 shown in FIG. 1 is used to adjust various devices (devices requiring cooling or heating) of a vehicle or the vehicle interior to an appropriate temperature.

In this embodiment, the heat management system 10 is applied to a hybrid vehicle that obtains a drive force for the traveling of a vehicle from an engine (internal combustion engine) and a vehicle-running electric motor.

The hybrid vehicle of this embodiment is formed as a plug-in hybrid vehicle that can charge a battery (in-vehicle battery), which is mounted on the vehicle, with power that is supplied from an external power supply (commercial power supply) at a time when the vehicle stops. For example, a lithium-ion battery can be used as the battery.

A drive force, which is output from the engine, is used for the traveling of the vehicle, and is also used for the operation of a generator. Further, power generated by a generator and power supplied from the external power supply can be stored in the battery, and the power stored in the battery is supplied to not only the vehicle-running electric motor but also various in-vehicle devices including electric components of a cooling system.

As shown in FIG. 1, the heat management system 10 includes a first pump 11, a second pump 12, and a third pump 13. The first pump 11, the second pump 12, and the third pump 13 are electric pumps that suck a coolant and discharge the coolant.

The first pump 11 is disposed on a flow passage 14 (a first path) for the first pump. The second pump 12 is disposed on one flow passage 15A for the second pump of two flow passages 15A and 15B (a second path) for the second pump. The second pump 12 may be disposed on the other flow passage 15B for the second pump. The third pump 13 is disposed on a flow passage 16 (a third path) for the third pump.

A medium-low temperature radiator 17 (a second-path radiator) is disposed on the flow passage 15B for the second pump. The medium-low temperature radiator 17 is a radiator (an exterior heat exchanger) that radiates the heat of the coolant to outside air by heat exchange between the coolant and air present outside the vehicle interior (hereinafter, referred to as outside air).

A bypass flow passage 18 (a first bypass flow passage) in which the coolant flows so as to bypass the medium-low temperature radiator 17 is connected to the flow passage 15B for the second pump. A three-way valve 19 is disposed at a portion of the flow passage 15B for the second pump to which the bypass flow passage 18 is connected. The three-way valve 19 is coolant flow switching means (a second-path switching device) for switching the flow of the coolant between a case in which a coolant flows into the medium-low temperature radiator 17 and a case in which a coolant flows into the bypass flow passage 18.

Closed reserve tanks 20, which can store the coolant, are connected to the flow passage 14 for the first pump and the flow passage 15A for the second pump. Since the closed reserve tanks 20 are used, an effect of maintaining the variation of liquid level in the reserve tanks 20 to the minimum is obtained even in an operating state in which the head of the first pump 11 is significantly different from the head of the second pump 12.

The engine 21 and an engine radiator 22 (a third-path radiator) are disposed on the flow passage 16 for the third pump. A flow passage in which a coolant flows is formed in the engine 21. The engine 21 is cooled by the coolant that flows into the engine. The engine radiator 22 is a radiator (an exterior heat exchanger) that radiates the heat of the coolant to outside air by heat exchange between the coolant and air present outside the vehicle interior (hereinafter, referred to as outside air).

Outside air is blown to the engine radiator 22 and the medium-low temperature radiator 17 by an outdoor air blower 23. Since the engine radiator 22 and the medium-low temperature radiator 17 are disposed at the foremost portion of the vehicle, traveling wind can be supplied to the engine radiator 22 and the medium-low temperature radiator 17 during the traveling of the vehicle.

A bypass flow passage 24 (a second bypass flow passage) in which the coolant flows so as to bypass the engine radiator 22 is connected to the flow passage 16 for the third pump. A three-way valve 25 is disposed at a portion of the flow passage 16 for the third pump to which the bypass flow passage 24 is connected. The three-way valve 25 is coolant flow switching means (a third-path switching device) for switching the flow of the coolant between a case in which the coolant flows into the engine radiator 22 and a case in which a coolant flows into the bypass flow passage 24.

A closed reserve tank 26, which can store the coolant, is connected to the flow passage 16 for the third pump.

A communication flow passage 27 is connected to a portion of the flow passage 14 for the first pump that is present on the upstream side of the first pump 11 and a portion of the flow passage 15A for the second pump that is present on the downstream side of the second pump 12. An opening/closing valve 28 is connected to the communication flow passage 27. The opening/closing valve 28 opens and closes the communication flow passage 27.

An upstream side of the flow passage 14 for the first pump is connected to a first outlet 31*a* of a first switching valve 31. An upstream side of the flow passage 15B for the second pump is connected to a second outlet 31*b* of the first switching valve 31.

The first switching valve 31 includes multiple inlets into which the coolant flows. The first switching valve 31 includes a valve body (not shown) for switching the flow of the coolant so that the coolant having flowed in from the respective inlets flows out from any one of the first and second outlets 31*a* and 31*b*.

A downstream side of the flow passage 14 for the first pump is connected to a first inlet 32*a* of a second switching valve 32. A downstream side of the flow passage 15A for the second pump is connected to a second inlet 32*b* of the second switching valve 32.

The second switching valve 32 includes multiple outlets from which the coolant flows out. The second switching valve 32 includes a valve body (not shown) for switching the flow of the coolant so that the coolant flowing out from the respective outlets becomes any one of the coolant having flowed in from the first inlet 32*a* and the coolant having flowed in from the second inlet 32*b*.

The valve body of the first switching valve 31 and the valve body of the second switching valve 32 are driven in conjunction with each other by a valve body-actuator mechanism 33.

A first flow passage group 34C, 34D, 34E, 34F, 34G, and 34H is connected to the respective outlets of the second switching valve 32 and the respective inlets of the first switching valve 31.

A first heat exchange target device group 81 (35, 36, 37, 38, 39, 40, 41, 42, and 43) is disposed on the flow passages 34C, 34D, 34E, 34F, and 34G of the first flow passage group, and heat exchange target devices are not disposed on the flow passage 34H of the first flow passage group. Accordingly, the flow passage 34H forms a bypass flow passage in which the coolant flows so as to bypass heat exchange target devices.

A battery charger 35, an inverter 36, and a vehicle-running electric motor 37, which are heat exchange target devices, are disposed on the flow passage 34C in series.

The battery charger 35 is used to charge a battery with power (external power) that is supplied from an external power supply. The inverter 36 is a power converter that converts DC power, which is supplied from the battery, into an AC voltage and outputs the AC voltage to the vehicle-running electric motor. The inverter 36 may be used as an example of a heat generator that generates heat. The vehicle-running electric motor 37 has a function as a motor that converts electrical energy into mechanical energy serving as the rotation of an output shaft and a function as a generator that converts the rotation (mechanical energy) of the output shaft into electrical energy.

An intake-air-cooling heat exchanger 38 is disposed on the flow passage 34D. The intake-air-cooling heat exchanger 38 cools supercharged intake air by heat exchange between the coolant and the supercharged intake air that has become high in temperature by being compressed in a supercharger.

A battery module 39 and a coolant-refrigerant heat exchanger 40 are disposed on the flow passage 34E in series. The battery module 39 is coolant-battery heat exchange means (heat transfer medium-battery heat exchange means) for exchanging heat between the coolant (a heat transfer medium) and the battery. The battery module 39 may be used as an example of a first heat storage device that is provided on the first flow passage group and can store at least one of heat and cold. The coolant-refrigerant heat exchanger 40 is a heat-medium refrigerant heat exchanger in that the coolant (the heat transfer medium) exchanges heat with a refrigerant of a refrigeration cycle 44.

A first air-heating heat exchanger 41 and a coolant-heating heat exchanger 42 (a heat-transfer-medium-heating heat exchanger) are disposed on the flow passage 34F in series. The first air-heating heat exchanger 41 heats blown air by heat exchange between air, which is blown into the vehicle interior, and the coolant. The coolant-heating heat exchanger 42 is a high pressure-side heat exchanger of the refrigeration cycle 44, and heats the coolant by heat exchange between a high-pressure refrigerant of the refrigeration cycle 44 and the coolant.

A coolant-cooling heat exchanger 43 (heat-transfer-medium-cooling heat exchanger) is disposed on the flow passage 34G. The coolant-cooling heat exchanger 43 is a low pressure-side heat exchanger of the refrigeration cycle 44, and cools the coolant by heat exchange between a low-pressure refrigerant of the refrigeration cycle 44 and the coolant.

The refrigeration cycle 44 includes a compressor 45, a first expansion valve 46, a second expansion valve 47, a third expansion valve 48, and an evaporator 49 in addition to the coolant-refrigerant heat exchanger 40, the coolant-heating heat exchanger 42, and the coolant-cooling heat exchanger 43 that have been described above.

The refrigeration cycle 44 is a vapor-compression refrigerator, and uses a chlorofluorocarbon refrigerant as a refrigerant in this embodiment. Accordingly, the refrigeration cycle 44 forms a subcritical refrigeration cycle of which high pressure-side refrigerant pressure does not exceed the critical pressure of a refrigerant.

The compressor 45 is an electric compressor that is driven by power supplied from a battery, sucks a gas-phase refrigerant, compresses the gas-phase refrigerant, and discharges the compressed refrigerant. The compressor 45 may be rotationally driven by the engine through a pulley, a belt, and the like.

Heat is exchanged between the gas-phase refrigerant, which is discharged from the compressor 45 and has a high temperature and a high pressure, and the coolant in the coolant-heating heat exchanger 42 that is the high pressure-side heat exchanger. Accordingly, the heat of the gas-phase refrigerant is absorbed by the coolant, so that the gas-phase refrigerant is condensed.

The first expansion valve 46 is pressure-reducing means for reducing the pressure of a liquid phase refrigerant, which has been condensed in the coolant-heating heat exchanger 42, and expanding the liquid phase refrigerant, and is formed of a variable throttle that can change a throttle opening. The refrigerant, which has passed through the first expansion valve 46, absorbs heat from the coolant by heat exchange between the coolant and itself in the coolant-refrigerant heat exchanger 40.

The second and third expansion valves 47 and 48 are pressure-reducing means for reducing the pressure of the refrigerant, which has absorbed heat in the coolant-cooling heat exchanger 43, and expanding the refrigerant. A low-pressure refrigerant, of which the pressure has been reduced and which has been expanded in the second expansion valve 47, absorbs heat and evaporates by heat exchange between the coolant and itself in the coolant-cooling heat exchanger 43 that is the low pressure-side heat exchanger. A gas-phase refrigerant, which has evaporated in the coolant-cooling heat exchanger 43, is sucked into the compressor 45 and is compressed.

The evaporator 49 is an air-cooling heat exchanger, which is blown into the vehicle interior, by heat exchange between the low-pressure refrigerant, of which pressure has been reduced and which has been expanded in the third expansion valve 48, and the blown air. A gas-phase refrigerant, which has absorbed heat from the coolant and has evaporated in the evaporator 49, is sucked into the compressor 45 and is compressed.

The coolant-cooling heat exchanger 43 cools the coolant by the low-pressure refrigerant of the refrigeration cycle 44, but the medium-low temperature radiator 17 and the engine radiator 22, which have been described above, cool the coolant by outside air. For this reason, the temperature of the coolant, which has been cooled in the coolant-cooling heat exchanger 43, is lower than the temperature of the coolant that has been cooled in the medium-low temperature radiator 17 and the temperature of the coolant that has been cooled in the engine radiator 22.

The evaporator 49 is disposed in a casing 50 of an indoor air conditioning unit. The casing 50 forms an air passage in which air blown by an indoor air blower 51 flows. The above-mentioned first air-heating heat exchanger 41 is disposed on the downstream side of the flow of air of the evaporator 49 in the casing 50.

An air-mix door 52 is disposed between the evaporator 49 and the first air-heating heat exchanger 41 in the casing 50 of the indoor air conditioning unit. The air-mix door 52 is air volume ratio adjusting means for adjusting a ratio of the amount of blown air, which passes through the first air-heating heat exchanger 41, to the amount of blown air that flows so as to bypass the first air-heating heat exchanger 41.

A downstream side of the flow passage 15B for the second pump is connected to a first inlet 53a of a third switching valve 53. A downstream side of the flow passage 16 for the third pump is connected to a second inlet 53b of the third switching valve 53.

The third switching valve 53 includes multiple outlets from which the coolant flows out. The third switching valve 53 includes a valve body (not shown) for switching the flow of the coolant so that the coolant flowing out from the respective outlets becomes any one of the coolant having flowed in from the first inlet 53a and the coolant having flowed in from the second inlet 53b.

An upstream side of the flow passage 15A for the second pump is connected to a first outlet 54a of a fourth switching valve 54. An upstream side of the flow passage 16 for the third pump is connected to a second outlet 54b of the fourth switching valve 54.

The fourth switching valve 54 includes multiple inlets into which the coolant flows. The fourth switching valve 54 includes a valve body (not shown) for switching the flow of the coolant so that the coolant having flowed in from the respective inlets flows out from any one of the first and second outlets 54a and 54b.

The valve body of the third switching valve 53 and the valve body of the fourth switching valve 54 are driven in conjunction with each other by a valve body-actuator mechanism 55.

A second flow passage group 56C, 56D, 56E, 56F, 56G, 56H, and 56I is connected to the respective inlets of the third switching valve 53 and the respective outlets of the fourth switching valve 54.

A second heat exchange target device group 82 (57, 58, 59, 60, 61, and 62) is disposed on the flow passages 56C, 56D, 56E, 56F, 56G, and 56H of the second flow passage group, and heat exchange target devices are not disposed on the flow passage 56I of the second flow passage group. Accordingly, the flow passage 56I forms a bypass flow passage in which the coolant flows so as to bypass heat exchange target devices.

A second heat exchanger 57 for heating air is disposed on the flow passage 56C. The second heat exchanger 57 for heating air heats blown air by heat exchange between air, which is blown into the vehicle interior, and the coolant. The second heat exchanger 57 for heating air is disposed on the downstream side of the first air-heating heat exchanger 41 in a direction of the flow of air in the casing 50 of the indoor air conditioning unit.

A throttle 58, which adjusts the amount of intake air of the engine 21, is disposed on the flow passage 56D. The throttle 58 is cooled by the coolant that flows into the flow passage 56D.

A supercharger 59, which supercharges the intake air of the engine 21 by using the residual energy of exhaust gas of the engine 21, is disposed on the flow passage 56E. The supercharger 59 is cooled by the coolant that flows into the flow passage 56E.

A exhaust-gas-cooling heat exchanger 60 (exhaust-gas heat exchanger), which cools exhaust gas returning to the intake side of the engine 21 by heat exchange between the exhaust gas and the coolant, is disposed on the flow passage 56F.

A coolant-oil heat exchanger 61 (oil heat exchanger), which cools or heats oil, such as engine oil (lubricating oil used in the engine 21) or ATF oil, by heat exchange between the oil and the coolant, is disposed on the flow passage 56G.

A second heat storage device 62, which can store at least one of heat and cold of the coolant, is disposed on the flow passage 56H.

Next, the details of the battery module 39 will be described with reference to FIGS. 2 to 5. The battery module 39 includes a casing 392 that receives a battery 391. It is preferable that the battery 391 be maintained at a temperature of about 10 to 40° C. for reasons such as the reduction of an output, the reduction of charging efficiency, and the prevention of degradation.

The casing 392 forms an air passage in which air blown from an air blower 393 flows. An inside air inlet port 392a through which air present in the vehicle interior (hereinafter, referred to as inside air) is introduced is formed at the casing 392.

The battery 391 is disposed at one end in the casing 392. The inside air inlet port 392a is formed at the other end in the casing 392. One end portion of the casing 392 in which the battery 391 is disposed is made of a heat insulating material. Accordingly, the battery module 39 has a heat-retaining structure that stores heat and cold in the battery 391.

The air blower 393 is disposed near the inside air inlet port 392a. When the air blower 393 operates, inside air is introduced from the inside air inlet port 392a and is blown into the air passage formed in the casing 392.

A partition plate 392d for partitioning a space, which is formed between the inside air inlet port 392a and the battery 391, into two air passages 392b and 392c is formed in the casing 392.

An air passage (not shown) in which air flows is formed in the battery 391. The battery 391 is cooled or heated by heat exchange between air, which flows into the battery 391, and itself. The air passage formed in the battery 391 communicates with the two air passages 392b and 392c that are formed in the casing 392.

Two air outlets 392e and 392f through which air having flowed into the air passages 392b and 392c is discharged are formed at the casing 392. One air outlet 392e communicates with one air passage 392b. The other air outlet 392f communicates with the other air passage 392c.

A battery heat exchanger 394 is disposed in the other air passage 392c. The battery heat exchanger 394 performs heat exchange between blown air and the coolant.

A drain 392g through which condensed water, which is generated when blown air passes through the battery heat exchanger 394, is discharged is formed at a portion of the casing 392 that is present near the battery heat exchanger 394.

Three air passage switching doors 395, 396, and 397 are disposed in the casing 392. The three air passage switching doors 395, 396, and 397 may be used as an example of air flow switching devices that switch the flow of air in the air passages 392b and 392c.

The first air passage switching door 395 switches the inside air inlet port 392a to the air passage 392b or 392c so that the inside air inlet port 392a communicates with the air passage 392b or 392c. The second air passage switching door 396 opens and closes one air outlet 392e. The third air passage switching door 397 opens and closes the other air outlet 392f.

The battery module 39 is switched to four modes, that is, a heat-retaining mode, a heat storage mode, a cold storage mode, and a recovery mode by operations for rotating the three air passage switching doors 395, 396, and 397.

Figure 3:
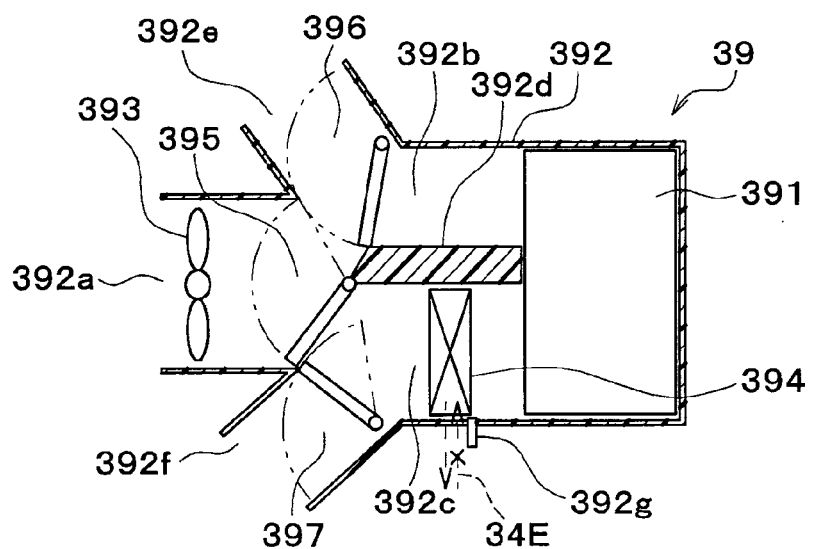
FIG. 3 is a schematic cross-sectional view illustrating a heat-retaining mode of the battery module of the first embodiment.

The three air passage switching doors 395, 396, and 397 close all of the inside air inlet port 392a and the air outlets 392e and 392f by being rotated to the positions of FIG. 3 in the heat-retaining mode.

Accordingly, the flow of both inside air and outside air is blocked in the air passage formed in the casing 392. For this reason, heat generated by the battery 391 is stored in the battery 391. Meanwhile, it is preferable that the flow of the coolant to the battery heat exchanger 394 be also blocked in the heat-retaining mode for the efficient storage of heat in the battery 391.

Figure 4:
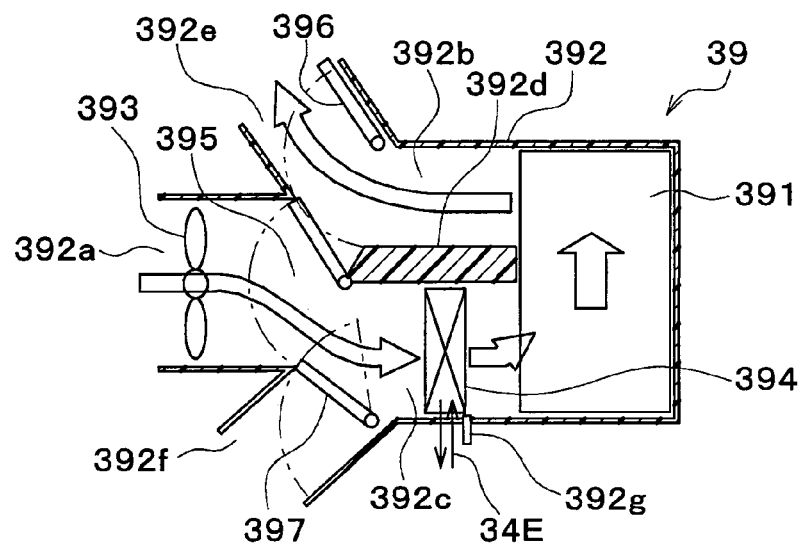
FIG. 4 is a schematic cross-sectional view illustrating a heat storage mode and a cold storage mode of the battery module of the first embodiment.

The heat storage mode is performed mainly when the temperature of outside air in winter is low (when the temperature of outside air is low). In the heat storage mode, as shown in FIG. 4, the first air passage switching door 395 makes the inside air inlet port 392a and the air passage 392c communicate with each other, the second air passage switching door 396 opens one air outlet 392e, and the third air passage switching door 397 closes the other air outlet 392f.

Accordingly, after inside air introduced from the inside air inlet port 392a flows into the air passage 392c and flows into the battery heat exchanger 394 and the battery 391 in this order, the inside air flows into the air passage 392b and is discharged from one air outlet 392e.

At this time, the coolant, which has been heated in the coolant-heating heat exchanger 42 or the like, flows into the battery heat exchanger 394. Accordingly, since inside air heated in the battery heat exchanger 394 flows into the battery 391, heat is stored in the battery 391.

The cold storage mode is performed mainly when the temperature of outside air in summer is high (when the temperature of outside air is high). In the cold storage mode, the three air passage switching doors 395, 396, and 397 are rotated as in the heat storage mode illustrated in FIG. 4.

Accordingly, after inside air introduced from the inside air inlet port 392a flows into the air passage 392c and flows into the battery heat exchanger 394 and the battery 391 in this order, the inside air flows into the air passage 392b and is discharged from one air outlet 392e.

At this time, the coolant, which has been cooled in the coolant-cooling heat exchanger 43, flows into the battery heat exchanger 394. Accordingly, since inside air cooled in the battery heat exchanger 394 flows into the battery 391, cold is stored in the battery 391.

Figure 5:
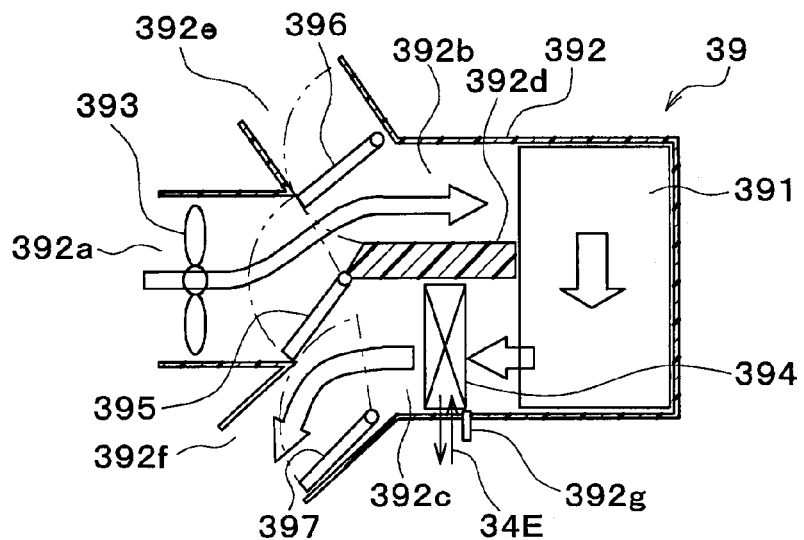
FIG. 5 is a schematic cross-sectional view illustrating a recovery mode of the battery module of the first embodiment.

The recovery mode is performed after the heat storage mode or the cold storage mode is performed, that is, when heat or cold is stored in the battery 391. In the recovery mode, as shown in FIG. 5, the first air passage switching door 395 makes the inside air inlet port 392a and the air passage 392b communicate with each other, the second air passage switching door 396 closes one air outlet 392e, and the third air passage switching door 397 opens the other air outlet 392f.

Accordingly, after inside air introduced from the inside air inlet port 392a flows into the air passage 392b and flows into the battery 391 and the battery heat exchanger 394 in this order, the inside air flows into the air passage 392c and is discharged from the other air outlet 392f.

At this time, when heat is stored in the battery 391, the coolant, which has been cooled in the coolant-cooling heat exchanger 43, flows into the battery heat exchanger 394. Accordingly, since inside air heated in the battery 391 flows into the battery heat exchanger 394, heat stored in the battery 391 can be recovered by the coolant.

Meanwhile, when cold is stored in the battery 391, the coolant, which has been heated in the coolant-heating heat exchanger 42 or the like, flows into the battery heat exchanger 394. Accordingly, since inside air cooled in the battery 391 flows into the battery heat exchanger 394, cold stored in the battery 391 can be recovered by the coolant.

Since the battery module 39 is switched to the heat storage mode, the cold storage mode, or the recovery mode, the pattern of the flow of air present in the vehicle interior can be switched to a first air guide passage pattern (a first air flow state) or a second air guide passage pattern (a second air flow state).

In the case of the first air guide passage pattern, air present in the vehicle interior flows into the battery heat exchanger 394, the battery 391, and the air outlet 392e in this order. The first air guide passage pattern is achieved by the switching of the battery module 39 to the heat storage mode or the cold storage mode.

In the case of the second air guide passage pattern, air present in the vehicle interior flows into the battery 391, the battery heat exchanger 394, and the air outlet 392f in this order. The second air guide passage pattern is achieved by the switching of the battery module 39 to the recovery mode.

Figure 6:
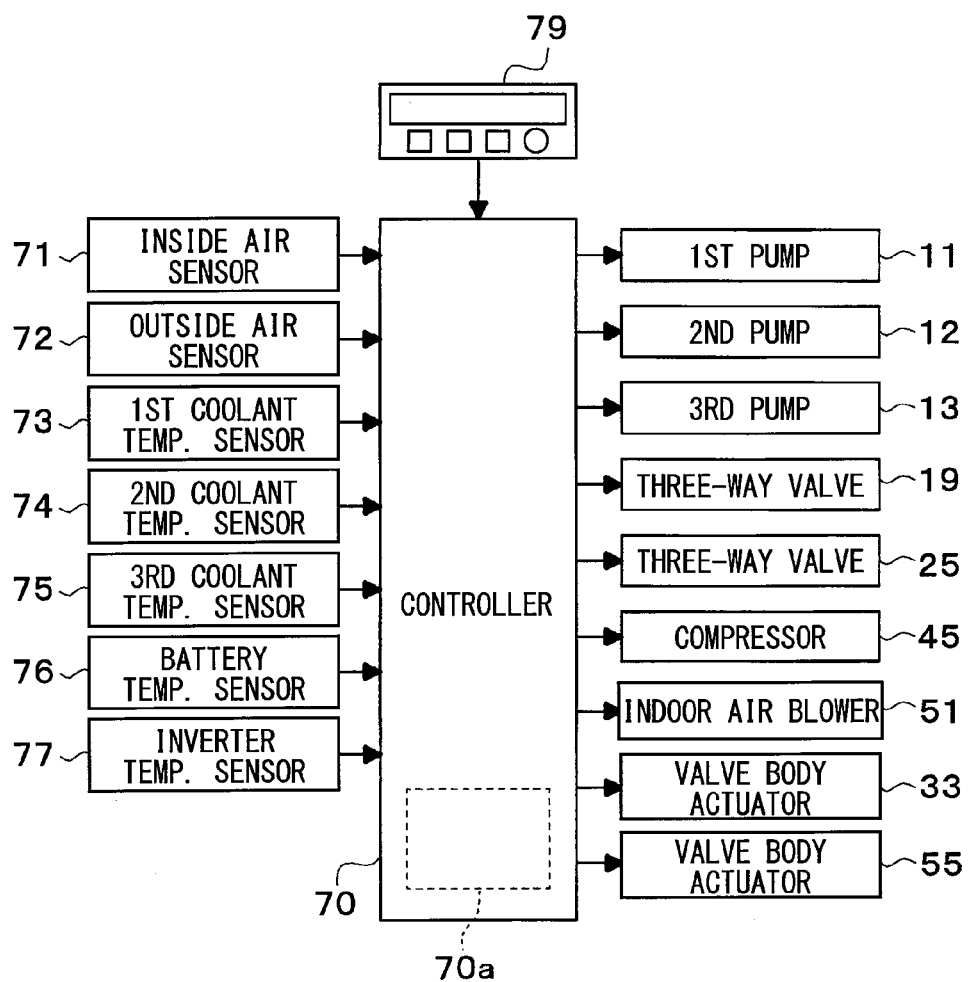
FIG. 6 is a schematic diagram showing an electric control section of the vehicle heat management system according to the first embodiment.

Next, an electric control section of the heat management system 10 will be described with reference to FIG. 6. A controller 70 includes a well-known microcomputer, which includes a CPU, a ROM, a RAM, and the like, and peripheral circuits thereof; and controls the operations of the first pump 11, the second pump 12, the third pump 13, the three-way valves 19 and 25, the compressor 45, the indoor air blower 51, the valve body-actuator mechanism 33 for the first and second switching valves 31 and 32, the valve body-actuator mechanism 55 for the third and fourth switching valves 53 and 54, and the like, which are connected to the output side of the controller 70, by performing various kinds of arithmetic operations and processing on the basis of an air-conditioning control program stored in the ROM.

The controller 70 is integrated with a control unit that controls various control target devices connected to the output side of the controller 70, but a structure (hardware and software) for controlling the operations of the respective control target devices forms a control unit that controls the operations of the respective control target devices.

In this embodiment, particularly, a switching valve control unit 70a is used as the structure (hardware and software) that controls the operations of the valve body-actuator mechanism 33 for the first and second switching valves 31 and 32 and the valve body-actuator mechanism 55 for the third and fourth switching valves 53 and 54. Of course, the switching valve control unit 70a may be formed separately from the controller 70.

Detection signals of various sensors, such as an inside air sensor 71, an outside air sensor 72, a first coolant temperature sensor 73, a second coolant temperature sensor 74, a third coolant temperature sensor 75, a battery temperature sensor 76, and an inverter temperature sensor 77, are input to the input side of the controller 70.

The inside air sensor 71 is detecting means (inside air temperature detecting means) for detecting the temperature of inside air (the temperature of air present in the vehicle interior). The outside air sensor 72 is detecting means (outside air temperature detecting means) for detecting the temperature of outside air.

The first coolant temperature sensor 73 is temperature detecting means for detecting the temperature of a coolant that flows into the flow passage 14 for the first pump. The second coolant temperature sensor 74 is temperature detecting means for detecting the temperatures of coolants that flow into the flow passages 15A and 15B for the second pump. The third coolant temperature sensor 75 is temperature detecting means for detecting the temperature of a coolant that flows into the flow passage 16 for the third pump.

The battery temperature sensor 76 is battery temperature detecting means for detecting the temperature of a coolant that flows out from the battery module 39. The inverter temperature sensor 77 is battery temperature detecting means for detecting the temperature of a coolant that flows out from the inverter 36.

Operation signals from various air-conditioning operation switches, which are provided on an operation panel 79 disposed near a dashboard positioned at the front portion of the vehicle interior, are input to the input side of the controller 70. An air conditioner switch, an automatic switch, an air volume setting switch of the indoor air blower 51, a switch for setting the temperature in the vehicle interior, and the like are provided as the various air-conditioning operation switches that are provided on the operation panel 79.

The air conditioner switch is a switch for switching the operation and stop (ON and OFF) of air-conditioning (cooling or heating). The automatic switch is a switch for setting or canceling the automatic control of air-conditioning. The switch for setting the temperature in the vehicle interior is target temperature setting means for setting a target temperature in the vehicle interior by the operation of an occupant.

Next, the operation of the above-mentioned configuration will be described. The controller 70 controls the operations of the first to fourth switching valves 31, 32, 53, and 54 (specifically, the valve body-actuator mechanisms 33 and 55), so that the heat management system 10 is switched to a first state shown in FIG. 7, a second state shown in FIG. 8, a third state shown in FIG. 9, and a fourth state shown in FIG. 10. To facilitate understanding, the simplified configuration of the vehicle heat management system 10 of FIG. 1 is shown in FIGS. 7 to 10.

Figure 7:
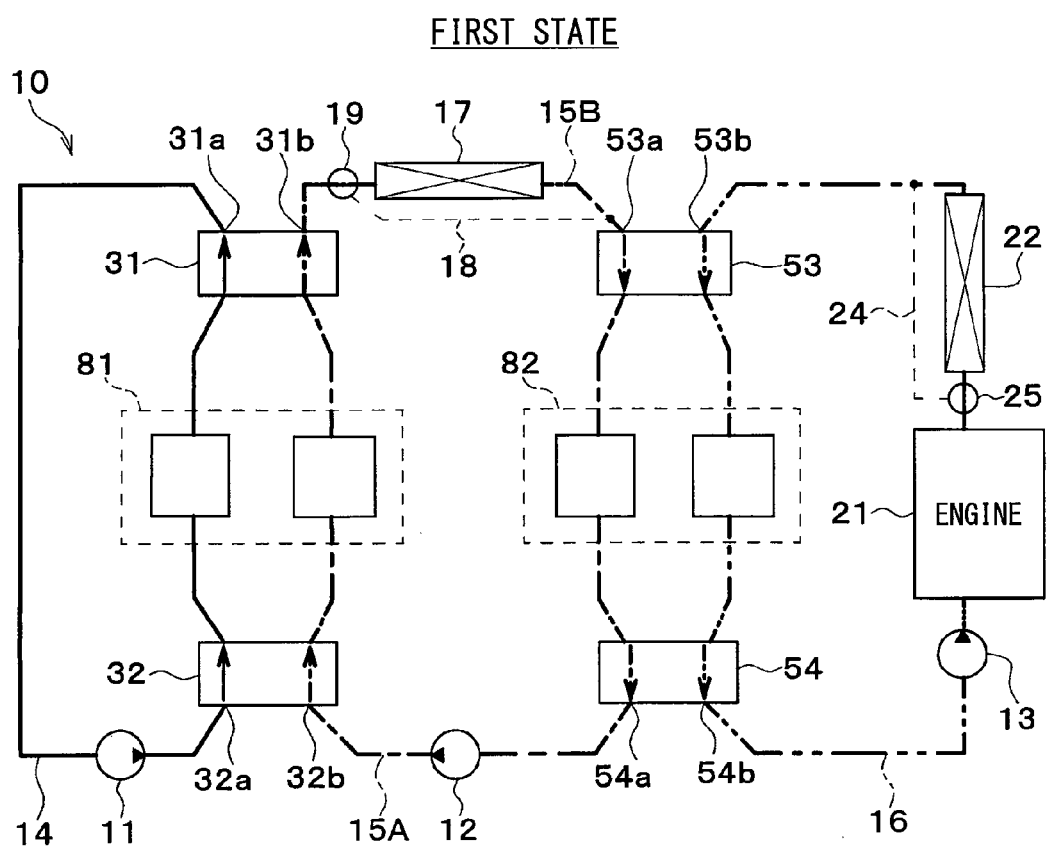
FIG. 7 is a schematic diagram illustrating a first state of the vehicle heat management system of FIG. 1.

In the first state shown in FIG. 7, the first and second switching valves 31 and 32 are controlled so that the flow passage communicated by the first switching valve 31 and the flow passage communicated by the second switching valve 32 are the same as each other in the respective flow passages of the first flow passage group connected to the first and second switching valves 31 and 32.

Moreover, the third and fourth switching valves 53 and 54 are controlled so that the flow passage communicated by the third switching valve 53 and the flow passage communicated by the fourth switching valve 54 are the same as each other in the respective flow passages of the second flow passage group connected to the third and fourth switching valves 53 and 54.

Accordingly, a first cooling circuit shown by a thick solid line, a second cooling circuit shown by a thick one-dot chain line, and a third cooling circuit shown by a thick two-dot chain line are formed.

Figure 8:
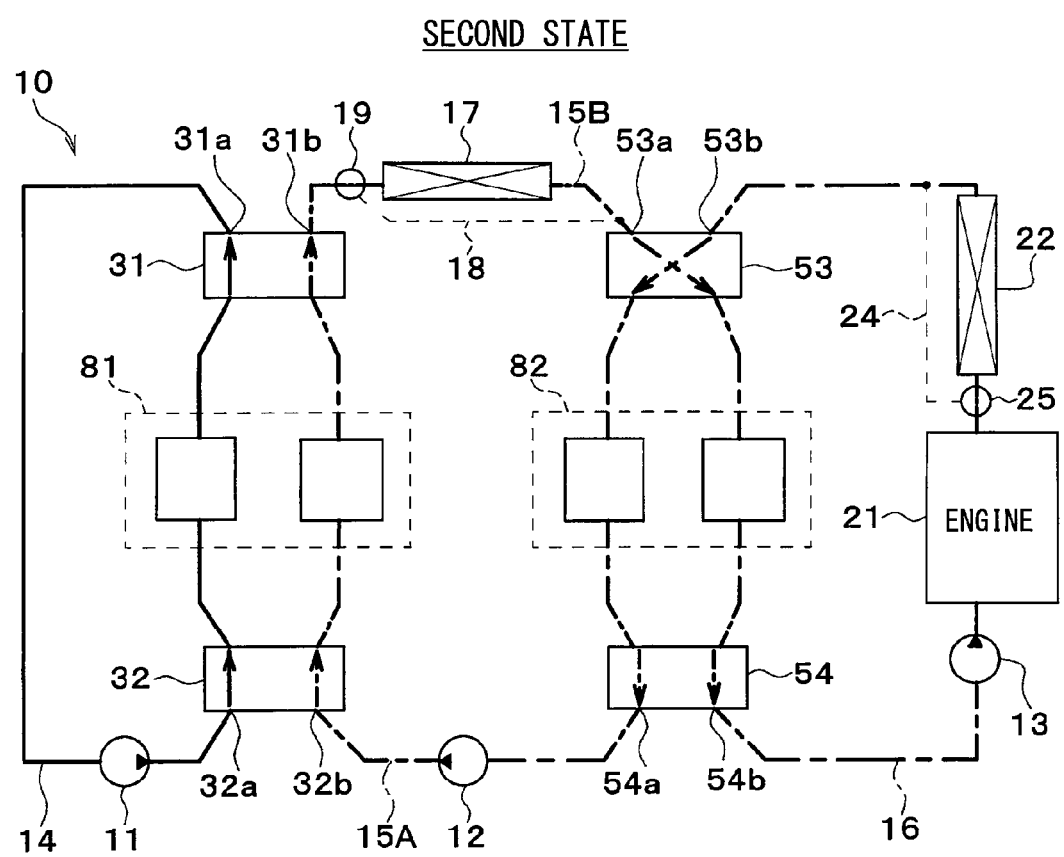
FIG. 8 is a schematic diagram illustrating a second state of the vehicle heat management system of FIG. 1.

In the second state shown in FIG. 8, the first and second switching valves 31 and 32 are controlled so that the flow passage communicated by the first switching valve 31 and the flow passage communicated by the second switching valve 32 are the same as each other in the respective flow passages of the first flow passage group connected to the first and second switching valves 31 and 32.

The third and fourth switching valves 53 and 54 are controlled so that the flow passage communicated by the third switching valve 53 and the flow passage communicated by the fourth switching valve 54 are different from each other in the respective flow passages of the second flow passage group connected to the third and fourth switching valves 53 and 54.

Accordingly, a first cooling circuit shown by a thick solid line and a second-third connected cooling circuit shown by a thick one-dot chain line are formed.

Figure 9:
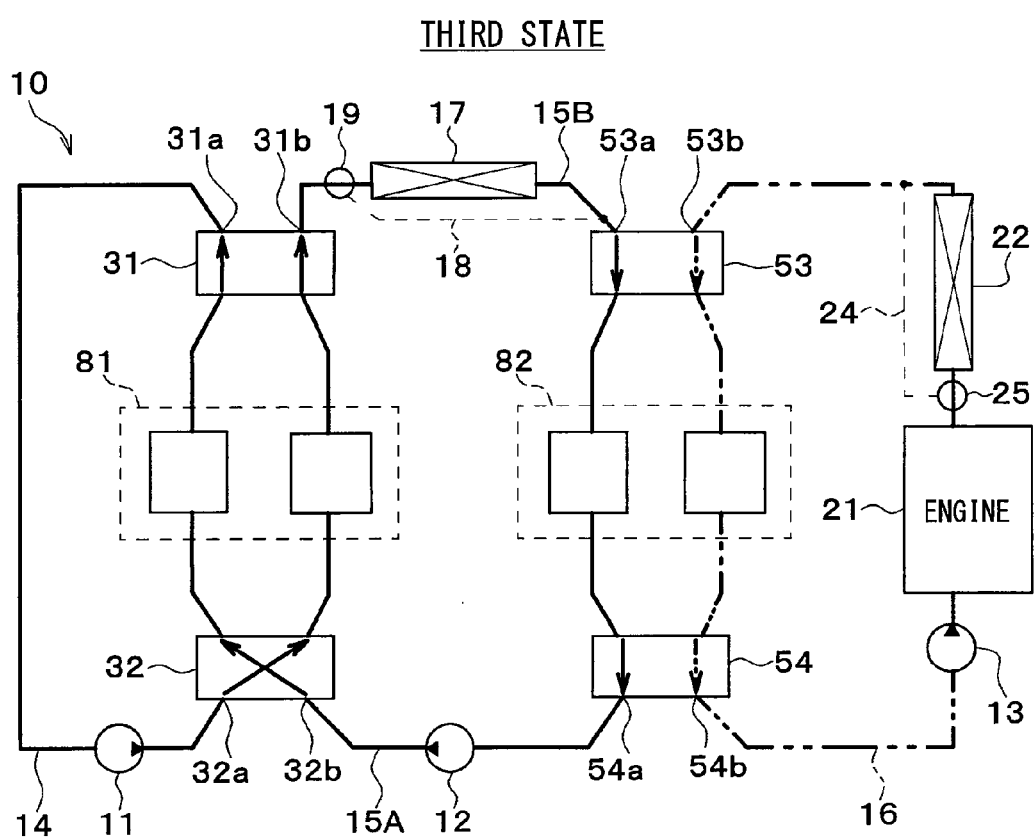
FIG. 9 is a schematic diagram illustrating a third state of the vehicle heat management system of FIG. 1.

In the third state shown in FIG. 9, the first and second switching valves 31 and 32 are controlled so that the flow passage communicated by the first switching valve 31 and the flow passage communicated by the second switching valve 32 are different from each other in the respective flow passages of the first flow passage group connected to the first and second switching valves 31 and 32.

The third and fourth switching valves 53 and 54 are controlled so that the flow passage communicated by the third switching valve 53 and the flow passage communicated by the fourth switching valve 54 are the same as each other in the respective flow passages of the second flow passage group connected to the third and fourth switching valves 53 and 54.

Accordingly, a first-second connected cooling circuit shown by a thick solid line and a third connected cooling circuit shown by a thick two-dot chain line are formed.

Figure 10:
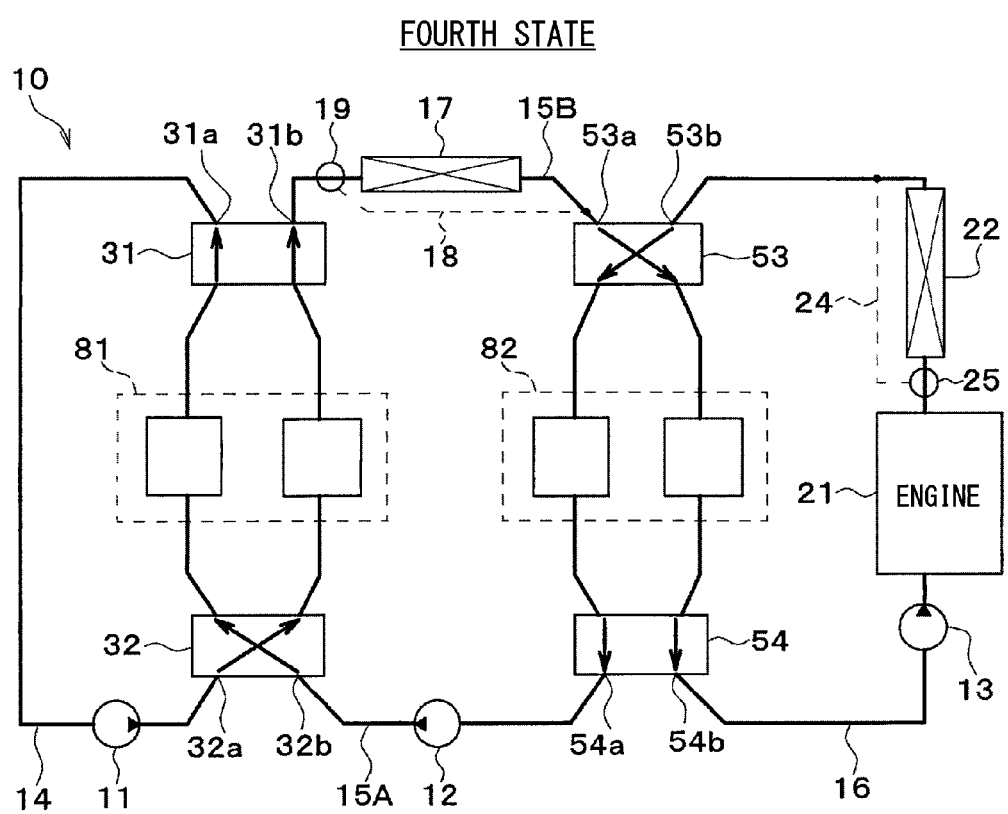
FIG. 10 is a schematic diagram illustrating a fourth state of the vehicle heat management system of FIG. 1.

In the fourth state shown in FIG. 10, the first and second switching valves 31 and 32 are controlled so that the flow passage communicated by the first switching valve 31 and the flow passage communicated by the second switching valve 32 are different from each other in the respective flow passages of the first flow passage group connected to the first and second switching valves 31 and 32.

The third and fourth switching valves 53 and 54 are controlled so that the flow passage communicated by the third switching valve 53 and the flow passage communicated by the fourth switching valve 54 are different from each other in the respective flow passages of the second flow passage group connected to the third and fourth switching valves 53 and 54.

Accordingly, a first-second-third connected cooling circuit shown by a thick solid line is formed.

Next, examples of specific operations performed in the first to fourth states shown in FIGS. 7 to 10 will be described. For example, the first state is switched when the temperature of a coolant flowing in the flow passage 16 for the third pump exceeds 60° C. Accordingly, since the flowing of a coolant of which the temperature has been raised by the waste heat of the engine 21 into the flow passage 14 for the first pump and the flow passages 15A and 15B for the second pump from the flow passage 16 for the third pump can be avoided, a device having a low allowable temperature can be protected from the heat damage of the engine 21.

For example, the switching of the state of the heat management system to the second state from the first state is performed when the temperature of a coolant flowing in the flow passage 15A for the second pump is higher than the temperature of a coolant flowing in the flow passage 16 for the third pump while the temperature of a coolant flowing in the flow passage 16 for the third pump is lower than 60° C., the coolant-heating heat exchanger 42 is connected to the second cooling circuit, and the three-way valve 19 is controlled so that a coolant flows into the medium-low temperature radiator 17.

Accordingly, the temperature of the coolant flowing in the flow passage 15A for the second pump can be lowered by using two radiators, that is, the medium-low temperature radiator 17 and the engine radiator 22.

When an instruction for performing the pre-warm-up of the engine (the warm-up of the engine performed before the start-up of the engine 21) is issued while the coolant-cooling heat exchanger 43 is connected to the second cooling circuit and the engine 21 stops, for example, in the second state, the coolant-heating heat exchanger 42 is connected to the second cooling circuit.

Accordingly, a coolant heated in the coolant-heating heat exchanger 42 flows into the engine 21. Therefore, the pre-warm-up of the engine can be performed.

When the temperature of a coolant flowing in the flow passage 15A for the second pump or the temperature of a coolant flowing in the flow passage 16 for the third pump reaches a temperature of 60° C. or higher while the coolant-heating heat exchanger 42 is connected to the second cooling circuit and the three-way valve 19 is controlled so that a coolant flows into the medium-low temperature radiator 17, the state of the heat management system is switched to the first state from the second state.

Accordingly, since the flowing of a coolant of which the temperature has been raised by the waste heat of the engine 21 into the flow passage 14 for the first pump and the flow passages 15A and 15B for the second pump from the flow passage 16 for the third pump can be avoided, a device having a low allowable temperature can be protected from the heat damage of the engine 21.

For example, the third state is switched when it is estimated that a failure (abnormality) occurs in one of the first and second pumps 11 and 12 and the temperature of a coolant flowing in the flow passage 16 for the third pump is 40° C. or more.

Accordingly, a coolant can be circulated as much as possible by the pump, in which a failure does not occur, of the first and second pumps 11 and 12. When the pump in which a failure has occurred is recovered in the third state, the state of the heat management system is switched to the first state.

Meanwhile, examples of a method of estimating the failure (abnormality) of the pump include a method of detecting the failure by transmitting the occurrence of the failure of a pump to the controller 70 with failure detection means installed on the pump (by transmitting the occurrence of a failure to the controller 70, for example, when the rotation speed of the pump deviates from a predetermined range (normal range) in response to a drive instruction output from the controller 70 or when the value of an operation current deviates from a predetermined range in response to a drive instruction output from the controller 70), and a method of estimating the failure (abnormality) of a pump from an internal logic of the controller 70 when the rotation speed of the pump deviates from a predetermined range (normal range) in response to a drive instruction output to the pump from the controller 70 after including means for transmitting a rotation speed signal of the pump to the controller 70.

For example, the fourth state is switched when all of the temperature of a coolant flowing in the flow passage 14 for the first pump, the temperature of a coolant flowing in the flow passage 15A for the second pump, and the temperature of a coolant flowing in the flow passage 16 for the third pump are lower than −10° C.

For example, the fourth state is switched to the second state when any one of the temperature of a coolant flowing in the flow passage 14 for the first pump, the temperature of a coolant flowing in the flow passage 15A for the second pump, and the temperature of a coolant flowing in the flow passage 16 for the third pump is equal to or higher than −10° C.

For example, the fourth state is switched when it is estimated that a failure occurs in one of the first and second pumps 11 and 12 and the temperature of a coolant flowing in the flow passage 16 for the third pump is lower than 40° C.

Accordingly, a coolant can be circulated as much as possible by the pump, in which a failure does not occur, of the first and second pumps 11 and 12 and the third pump 13. Further, when the engine 21 starts up, the state of the heat management system is switched to the third state from the fourth state. Accordingly, since the flowing of a coolant of which the temperature has been raised by the waste heat of the engine 21 into the flow passage 14 for the first pump and the flow passages 15A and 15B for the second pump from the flow passage 16 for the third pump can be avoided, a device having a low allowable temperature can be protected from the heat damage of the engine 21.

Second Embodiment

An operation mode, when a failure occurs in one of the first and second pumps 11 and 12, will be described in a second embodiment.

Figure 11:
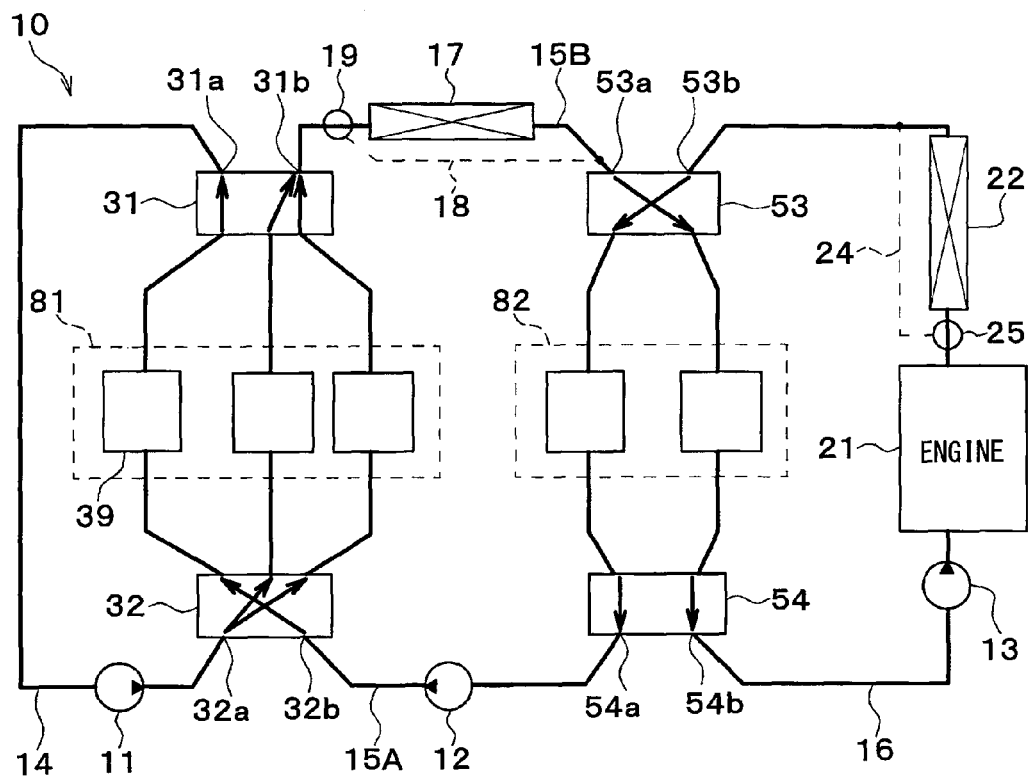
FIG. 11 is a schematic diagram showing a vehicle heat management system according to a second embodiment.

When it is estimated that a failure occurs in one of the first and second pumps 11 and 12, the engine 21 does not operate, and the temperature of a coolant flowing in the flow passage 16 for the third pump is lower than a higher temperature of the temperature of a coolant flowing in the flow passage 14 for the first pump and the temperature of a coolant flowing in the flow passage 15A for the second pump, a first-second-third connected cooling circuit (thick solid line) is formed as shown in FIG. 11. To facilitate understanding, the simplified configuration of the vehicle heat management system 10 is shown in FIG. 11.

Accordingly, the cooling of the heat exchange target devices can continue as long as possible by the operation of the pump, in which a failure does not occur, of the first and second pumps 11 and 12 and the operation of the third pump 13.

A device, which has an allowable temperature equal to or lower than a predetermined temperature (assumed as about 40° C.), (the battery module 39 in the example of FIG. 11) of the first heat exchange target device group 81 is connected to the first-second-third connected cooling circuit alone, and the other devices thereof are connected to the first-second-third connected cooling circuit in parallel.

Accordingly, since the flow rate of a coolant flowing in the device, which has a low allowable temperature, (the battery module 39 in the example of FIG. 11) is increased as much as possible, heat damage can be prevented as much as possible.

Third Embodiment

An operation mode, when a failure occurs in one of the second and third pumps 12 and 13, will be described in a third embodiment.

Figure 12:
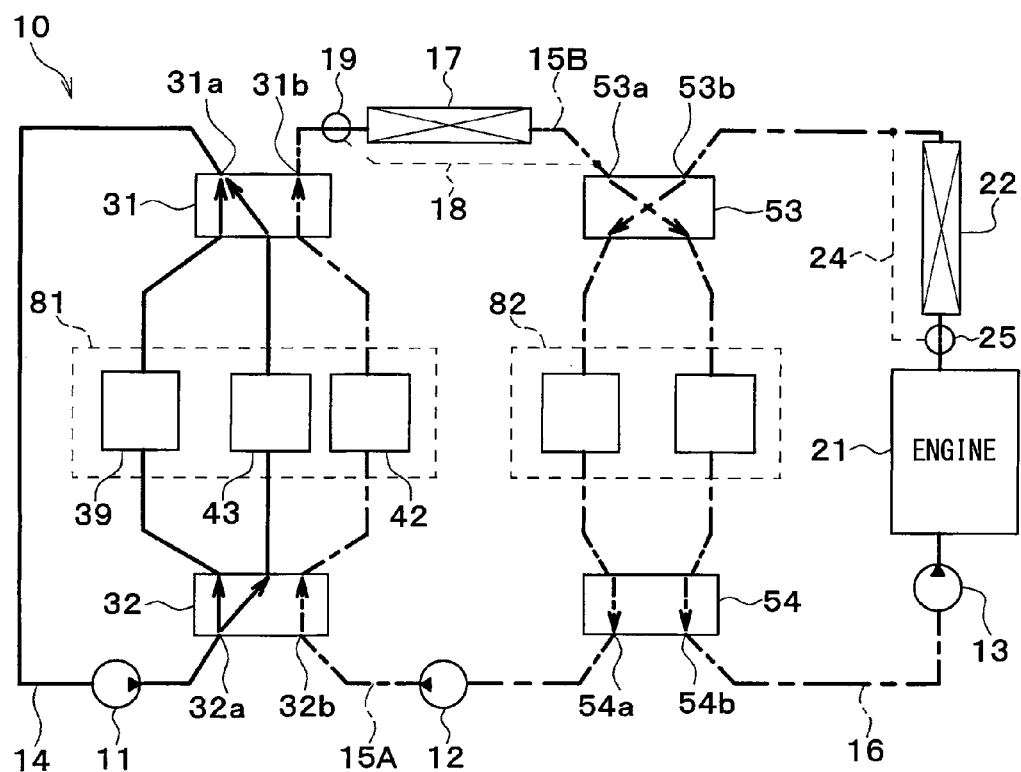
FIG. 12 is a schematic diagram showing a vehicle heat management system according to a third embodiment.

When it is estimated that a failure occurs in one of the second and third pumps 12 and 13, a first cooling circuit (thick solid line) and a second-third connected cooling circuit (thick one-dot chain line) are formed as shown in FIG. 12. To facilitate understanding, the simplified configuration of the vehicle heat management system 10 is shown in FIG. 12.

A device, which has an allowable temperature equal to or lower than a predetermined temperature (assumed as about 40° C.), (the battery module 39 in the example of FIG. 12) of the first heat exchange target device group 81 is connected to the first cooling circuit together with the coolant-cooling heat exchanger 43, and a device (the coolant-heating heat exchanger 42 in the example of FIG. 12), which has a medium allowable temperature (about 60° C.), of the first heat exchange target device group 81 is connected to the second-third connected cooling circuit.

Accordingly, the cooling of the heat exchange target devices can continue as long as possible by the operation of the pump, in which a failure does not occur, of the second and third pumps 12 and 13.

Fourth Embodiment

An operation mode, which warms up oil by the heat stored in the first heat storage device, will be described in a fourth embodiment.

Figure 13:
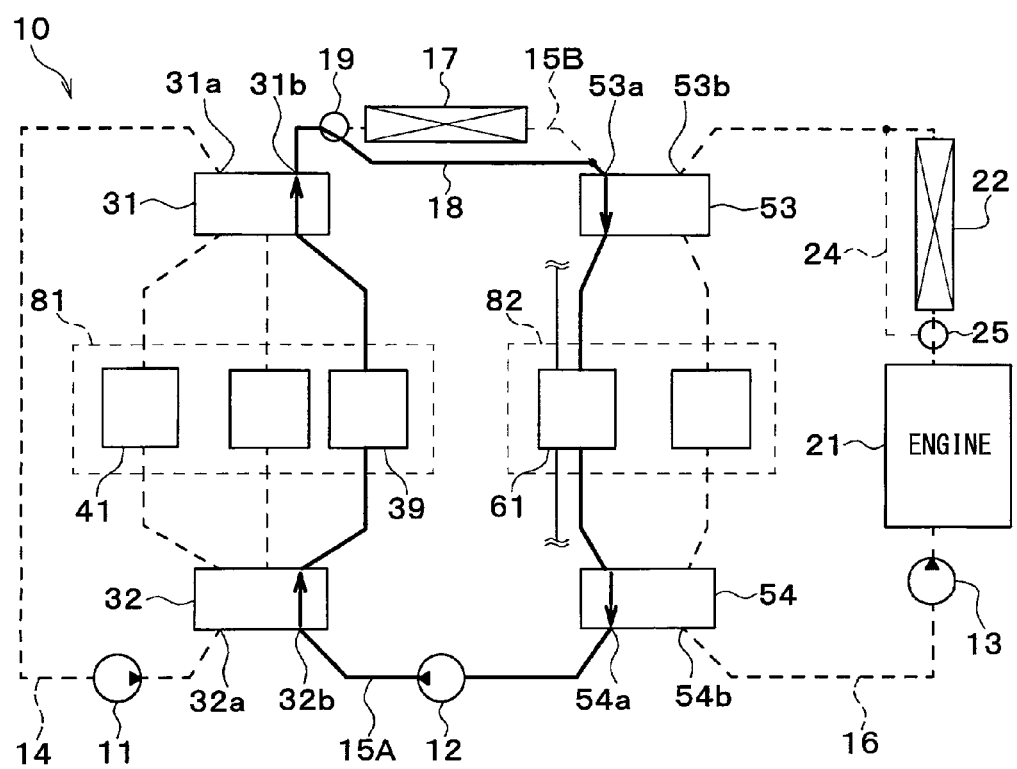
FIG. 13 is a schematic diagram showing a vehicle heat management system according to a fourth embodiment.

When the temperature of a coolant flowing in the first heat storage device (the battery module 39 in the example of FIG. 13) is equal to or higher than the temperature of oil flowing in the coolant-oil heat exchanger 61 and is equal to or higher than a predetermined temperature, a first cooling circuit (left broken line), a second cooling circuit (thick solid line), and a third cooling circuit (right broken line) are formed as shown in FIG. 13 and the three-way valve 19 is controlled so that a coolant flows into the bypass flow passage 18 in the second cooling circuit. To facilitate understanding, the simplified configuration of the vehicle heat management system 10 is shown in FIG. 13.

The first heat storage device (the battery module 39 in the example of FIG. 13) of the first heat exchange target device group 81 is connected to the second cooling circuit, and the coolant-oil heat exchanger 61 of the second heat exchange target device group 82 is connected to the second cooling circuit.

Accordingly, since a coolant heated in the first heat storage device (the battery module 39 in the example of FIG. 13) flows into the coolant-oil heat exchanger 61, engine oil or ATF oil can be warmed up.

Since a coolant flows into the bypass flow passage 18 in the second cooling circuit, the radiation of heat of the coolant of the second cooling circuit to the outside air performed by the medium-low temperature radiator 17 can be prevented. For this reason, heat stored in the first heat storage device (the battery module 39 in the example of FIG. 13) can be efficiently used to warm up oil.

Meanwhile, when a difference between the temperature of a coolant of the first heat storage device (the battery module 39 in the example of FIG. 13) and the temperature of engine oil is equal to or smaller than a predetermined value, control for ending this operation mode is performed.

In the example of FIG. 13, the first heat storage device (the battery module 39 in the example of FIG. 13) has been included in the first heat exchange target device group 81. However, the heat storage device may be included in the second heat exchange target device group 82.

In a case in which the first heat storage device (the battery module 39 in the example of FIG. 13) and the coolant-oil heat exchanger 61 communicate with each other as shown in FIG. 13, the battery module 39 is switched to the above-mentioned recovery mode and the pattern of the flow of air present in the vehicle interior is switched to the above-mentioned second air guide passage pattern (the second air flow state) when the temperature of the battery 391 is higher than the temperature of air present in the vehicle interior, and the battery module 39 is switched to the above-mentioned heat storage mode or the above-mentioned cold storage mode and the pattern of the flow of air present in the vehicle interior is switched to the above-mentioned first air guide passage pattern (the first air flow state) when the temperature of the battery 391 is lower than the temperature of air present in the vehicle interior. As a result, oil can be warmed up by heat recovered from the air that has been present in the vehicle interior and is discharged to the outside of the vehicle for ventilation.

When the temperature of the battery 391 is higher than the temperature of air present in the vehicle interior, the pattern of the flow of air present in the vehicle interior is switched to the second air guide passage pattern and the air present in the vehicle interior flows into the battery 391, the battery heat exchanger 394, and the air outlet 392f in this order. Accordingly, both the heat of the air present in the vehicle interior and the heat of the battery 391 are recovered by a coolant in the battery heat exchanger 394, and can be used to warm up oil.

When the temperature of the battery 391 is lower than the temperature of air present in the vehicle interior, the pattern of the flow of air present in the vehicle interior is switched to the first air guide passage pattern and the air present in the vehicle interior flows into the battery heat exchanger 394, the battery 391, and the air outlet 392e in this order. Accordingly, the heat of the air present in the vehicle interior is recovered by a coolant in the battery heat exchanger 394, and can be used to warm up oil.

Fifth Embodiment

An operation mode, which warms up the engine by the heat stored in the first heat storage device, will be described in a fifth embodiment.

Figure 14:
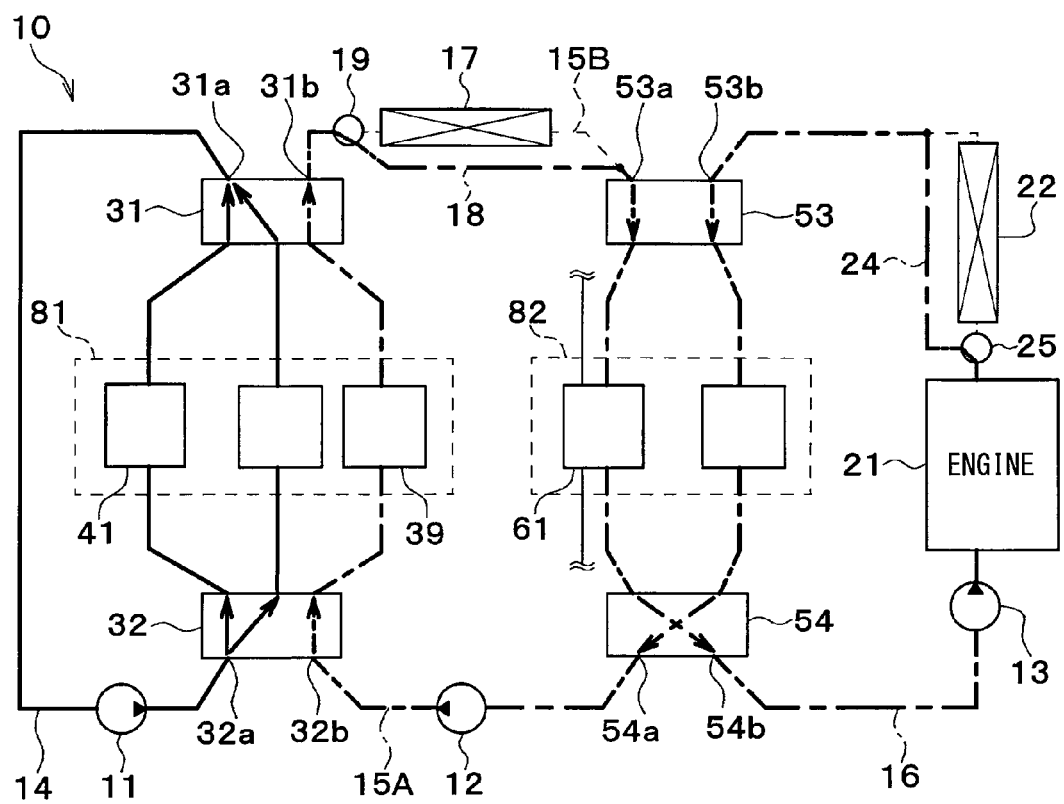
FIG. 14 is a schematic diagram showing a vehicle heat management system according to a fifth embodiment.

In this operation mode, a first cooling circuit (thick solid line) and a second-third connected cooling circuit (thick one-dot chain line) are formed as shown in FIG. 14 and the three-way valves 19 and 25 are controlled so that a coolant flows into the bypass flow passages 18 and 24 in the second-third connected cooling circuit. To facilitate understanding, the simplified configuration of the vehicle heat management system 10 is shown in FIG. 14.

The first heat storage device (the battery module 39 in the example of FIG. 14) of the first heat exchange target device group 81 is connected to the second-third connected cooling circuit, and the coolant-oil heat exchanger 61 of the second heat exchange target device group 82 is connected to the second-third connected cooling circuit.

Further, when the temperature of oil is lower than a predetermined temperature, the third and fourth switching valves 53 and 54 are controlled so that a coolant having flowed into the bypass flow passage 18 flows into the coolant-oil heat exchanger 61 and then flows into the engine 21 as shown in FIG. 14. When the temperature of oil is equal to or higher than a predetermined temperature, the third and fourth switching valves 53 and 54 are controlled so that a coolant having flowed into the bypass flow passage 18 flows into the engine 21 and then flows into the coolant-oil heat exchanger 61.

Accordingly, engine oil or ATF oil can be warmed up when the temperature of oil is lower than the predetermined temperature, and the engine 21 can be warmed up when the temperature of oil is equal to or higher than the predetermined temperature.

In a case in which the first heat storage device (the battery module 39 in the example of FIG. 14) and the engine 21 communicate with each other as shown in FIG. 14, the battery module 39 is switched to the above-mentioned recovery mode and the pattern of the flow of air present in the vehicle interior is switched to the above-mentioned second air guide passage pattern (the second air flow state) when the temperature of the battery 391 is higher than the temperature of air present in the vehicle interior, and the battery module 39 is switched to the above-mentioned heat storage mode or the above-mentioned cold storage mode and the pattern of the flow of air present in the vehicle interior is switched to the above-mentioned first air guide passage pattern (the first air flow state) when the temperature of the battery 391 is lower than the temperature of air present in the vehicle interior. As a result, the engine 21 can be warmed up by heat recovered from the air that has been present in the vehicle interior and is discharged to the outside of the vehicle for ventilation.

When the temperature of the battery 391 is higher than the temperature of air present in the vehicle interior, the pattern of the flow of air present in the vehicle interior is switched to the second air guide passage pattern and the air present in the vehicle interior flows into the battery 391, the battery heat exchanger 394, and the air outlet 392f in this order. Accordingly, both the heat of the air present in the vehicle interior and the heat of the battery 391 are recovered by a coolant in the battery heat exchanger 394, and can be used to warm up the engine.

When the temperature of the battery 391 is lower than the temperature of air present in the vehicle interior, the pattern of the flow of air present in the vehicle interior is switched to the first air guide passage pattern and the air present in the vehicle interior flows into the battery heat exchanger 394, the battery 391, and the air outlet 392e in this order. Accordingly, the heat of the air present in the vehicle interior is recovered by a coolant in the battery heat exchanger 394, and can be used to warm up the engine.

Sixth Embodiment

An operation mode, which warms up oil by the operation of a heat pump absorbing heat from the first heat storage device, will be described in a sixth embodiment. This operation mode is performed under a temperature condition where oil cannot be directly warmed up by the heat stored in the first heat storage device.

Figure 15:
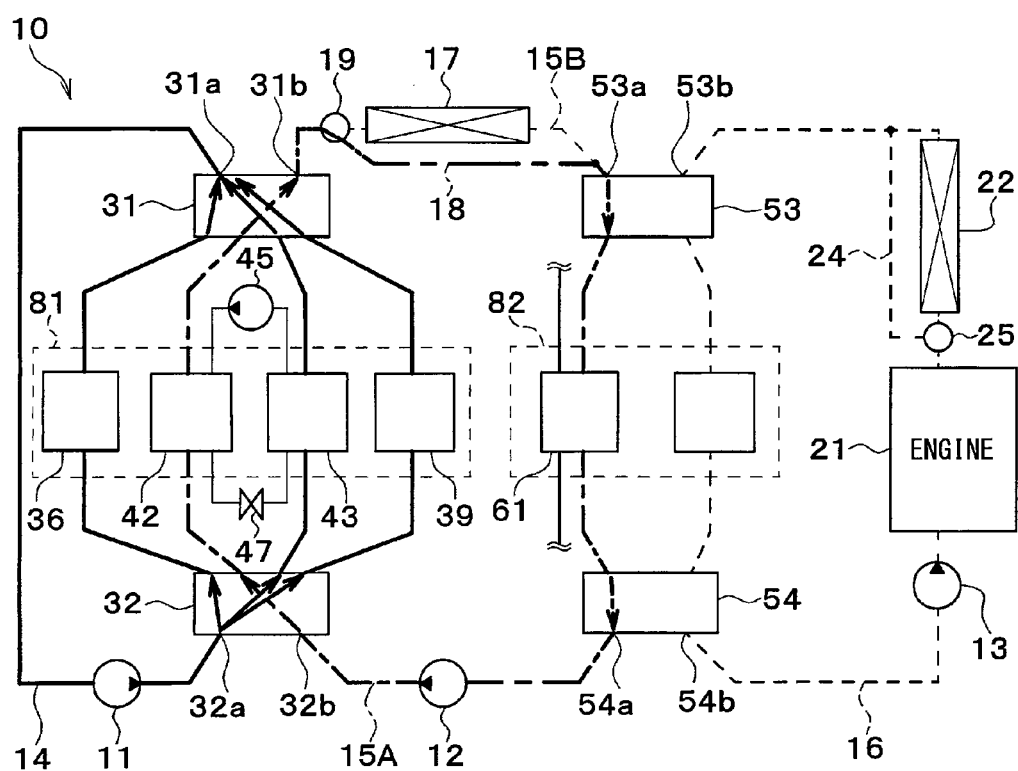
FIG. 15 is a schematic diagram showing a vehicle heat management system according to a sixth embodiment.

Specifically, when the temperature of a coolant flowing in the first heat storage device (the battery module 39 in the example of FIG. 15) is equal to or lower than the temperature of oil flowing in the coolant-oil heat exchanger 61 and is equal to or lower than a predetermined temperature, a first cooling circuit (thick solid line) and a second cooling circuit (thick one-dot chain line) are formed as shown in FIG. 15. To facilitate understanding, the simplified configuration of the vehicle heat management system 10 is shown in FIG. 15.

When the allowable temperature of a device, which generates heat, (the inverter 36 in the example of FIG. 15) of the first heat exchange target device group 81 is lower than the temperature of a coolant of the first heat storage device (the battery module 39 in the example of FIG. 15), the device, which generates heat, (the inverter 36 in the example of FIG. 15) is connected to the first cooling circuit together with the coolant-cooling heat exchanger 43 and the first heat storage device (the battery module 39 in the example of FIG. 15) and the coolant-heating heat exchanger 42 is connected to the second cooling circuit together with the coolant-oil heat exchanger 61.

Further, the three-way valve 19 is controlled so that a coolant flows into the bypass flow passage 18 in the second cooling circuit.

Accordingly, the heat of the first heat storage device (the battery module 39 in the example of FIG. 15) and the heat of the device, which generates heat, (the inverter 36 in the example of FIG. 15) are absorbed in the coolant-cooling heat exchanger 43 and the heat absorbed in the coolant-cooling heat exchanger 43 is radiated in the coolant-cooling heat exchanger 43, so that the coolant of the second cooling circuit is heated. Further, since the coolant of the second cooling circuit heated in the coolant-cooling heat exchanger 43 flows into the coolant-oil heat exchanger 61, oil can be warmed up.

Meanwhile, the circulation of a coolant in the third cooling circuit basically stops in this operation mode. The reason for this is that the engine 21 basically does not operate in a scene where the heating of the heat pump is performed. However, for example, when the temperature of a coolant of the third cooling circuit is low, that is, when the engine is warmed up, and the like, a coolant circulates even in the third cooling circuit.

When the allowable temperature of the device, which generates heat, (the inverter 36 in the example of FIG. 15) is higher than the temperature of a coolant of a cooling circuit communicating with the coolant-heating heat exchanger 42, the device, which generates heat, (the inverter 36 in the example of FIG. 15) may communicate with the coolant-heating heat exchanger 42.

Seventh Embodiment

An operation mode, which warms up the engine by the operation of a heat pump absorbing heat from the first heat storage device, will be described in a seventh embodiment. This operation mode is performed when the temperature of oil flowing in the coolant-oil heat exchanger 61 is equal to or higher than a predetermined temperature in the operation mode of the sixth embodiment.

Figure 16:
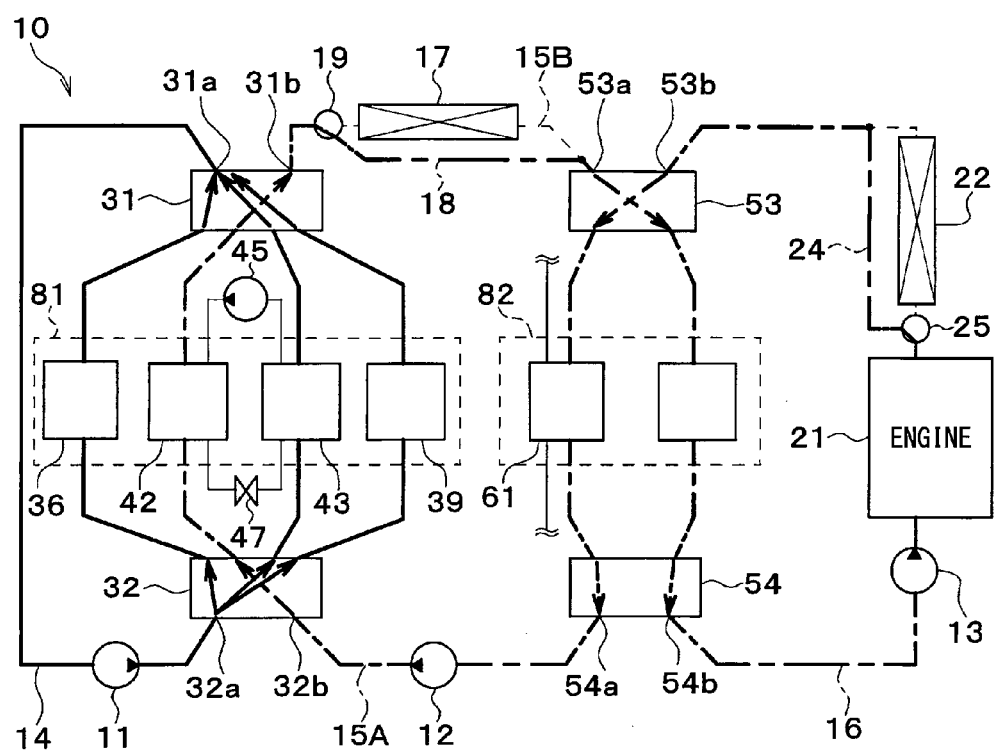
FIG. 16 is a schematic diagram showing a vehicle heat management system according to a seventh embodiment.

Specifically, a first cooling circuit (thick solid line) and a second-third connected cooling circuit (thick one-dot chain line) are formed as shown in FIG. 16.

The coolant-cooling heat exchanger 43 and the first heat storage device (the battery module 39 in the example of FIG. 16) of the first heat exchange target device group 81 are connected to the first cooling circuit, and the coolant-heating heat exchanger 42 of the first heat exchange target device group 81 is connected to the second-third connected cooling circuit.

Further, the three-way valves 19 and 25 are controlled so that a coolant flows into the bypass flow passages 18 and 24 in the second-third connected cooling circuit.

Accordingly, the heat of the first heat storage device (the battery module 39 in the example of FIG. 16) is absorbed in the coolant-cooling heat exchanger 43 and the heat absorbed in the coolant-cooling heat exchanger 43 is radiated in the coolant-cooling heat exchanger 43, so that the coolant of the second-third connected cooling circuit is heated. Further, since the coolant of the second-third connected cooling circuit heated in the coolant-cooling heat exchanger 43 flows into the engine 21, the engine 21 can be warmed up.

Since a coolant flows into the bypass flow passages 18 and 24 in the second-third connected cooling circuit, the radiation of heat of the coolant of the second-third connected cooling circuit to the outside air performed by the medium-low temperature radiator 17 and the engine radiator 22 can be prevented. Accordingly, the engine 21 can be efficiently warmed up.

Eighth Embodiment

An operation mode, which performs heating by the operation of a heat pump absorbing the heat of the outside air from the medium-low temperature radiator 17, will be described in an eighth embodiment.

Figure 17:
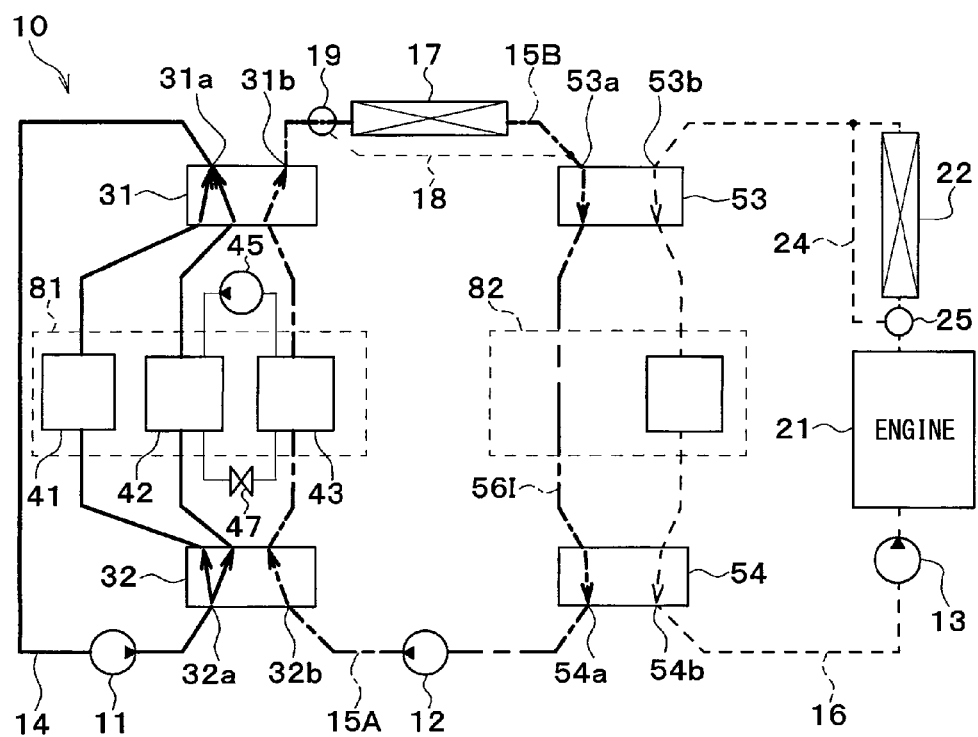
FIG. 17 is a schematic diagram showing a vehicle heat management system according to an eighth embodiment.

When the temperature of the outside air is higher than a predetermined temperature, a first cooling circuit (thick solid line) and a second cooling circuit (thick one-dot chain line) are formed as shown in FIG. 17.

The coolant-heating heat exchanger 42 and the first air-heating heat exchanger 41 of the first heat exchange target device group 81 are connected to the first cooling circuit and the coolant-cooling heat exchanger 43 of the first heat exchange target device group 81 is connected to the second cooling circuit. The bypass flow passage 56I is connected to the second cooling circuit in the second heat exchange target device group 82.

According to this, the coolant of the second cooling circuit, which has been cooled to a temperature lower than the temperature of the outside air in the coolant-cooling heat exchanger 43, flows in the medium-low temperature radiator 17. Accordingly, the heat of the outside air can be absorbed in the medium-low temperature radiator 17.

The heat of the outside air, which has been absorbed in the medium-low temperature radiator 17, is radiated to a coolant of the first cooling circuit in the coolant-heating heat exchanger 42 by the operation of a heat pump of the refrigeration cycle 44. For this reason, air, which is blown into the vehicle interior, can be heated in the first air-heating heat exchanger 41.

Figure 18:
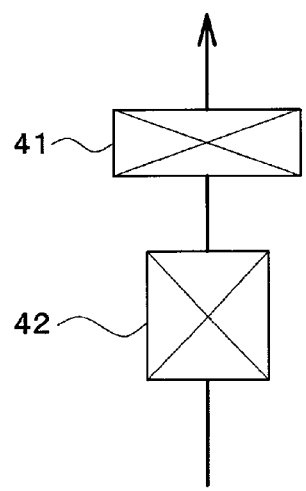
FIG. 18 is a diagram showing an example of the configuration of the vehicle heat management system according to the eighth embodiment.

In this operation mode, heating capacity is improved when the first air-heating heat exchanger 41 and the coolant-heating heat exchanger 42 are disposed in series in the direction of the flow of a coolant as shown in FIG. 18.

When the battery module 39 of the first heat exchange target device group 81 is connected to the first cooling circuit, the battery 391 can be warmed by the heat of the outside air that is absorbed in the medium-low temperature radiator 17.

Ninth Embodiment

An operation mode, which performs heating by the operation of a heat pump absorbing the heat of the outside air from the engine radiator 22, will be described in a ninth embodiment.

Figure 19:
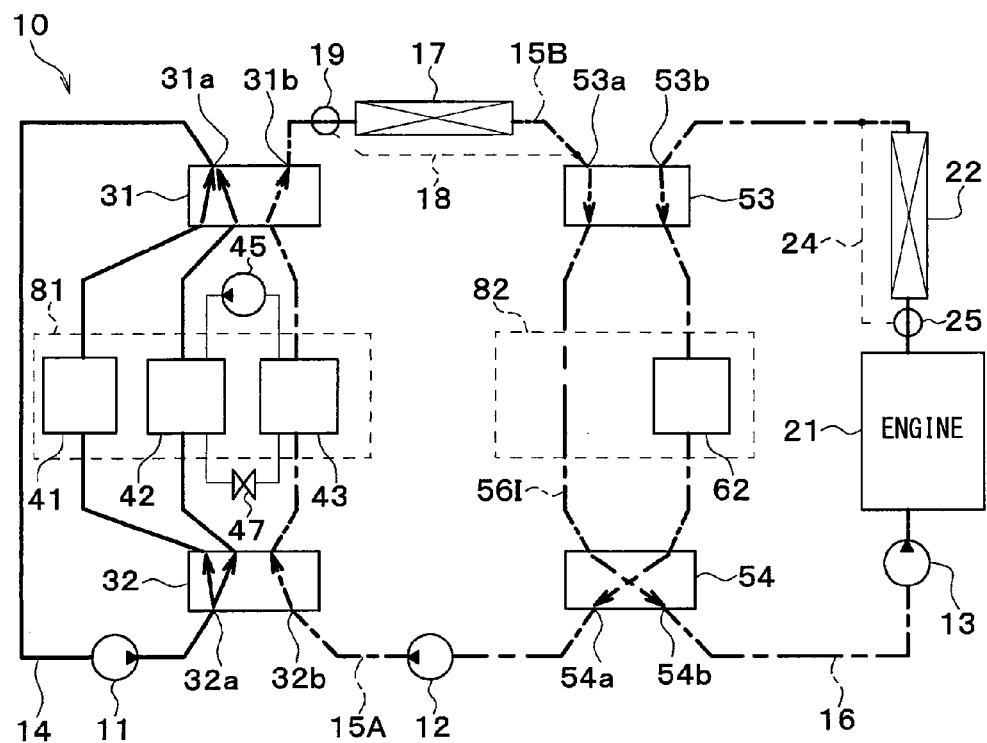
FIG. 19 is a schematic diagram showing a vehicle heat management system according to a ninth embodiment.

When the temperature of the outside air is lower than a predetermined temperature, a first cooling circuit (thick solid line) and a second-third connected cooling circuit (thick one-dot chain line) are formed as shown in FIG. 19. Further, the three-way valve 19 is controlled so that a coolant flows into the bypass flow passage 18 in the second-third connected cooling circuit.

The coolant-heating heat exchanger 42 and the first air-heating heat exchanger 41 of the first heat exchange target device group 81 are connected to the first cooling circuit and the coolant-cooling heat exchanger 43 of the first heat exchange target device group 81 is connected to the second cooling circuit. The bypass flow passage 56I is connected to the second cooling circuit in the second heat exchange target device group 82.

According to this, a coolant of the second-third connected cooling circuit, which has been cooled to a temperature lower than the temperature of the outside air in the coolant-cooling heat exchanger 43, flows into the engine radiator 22. Accordingly, the heat of the outside air can be absorbed in the engine radiator 22.

The heat of the outside air, which has been absorbed in the engine radiator 22, is radiated to a coolant of the first cooling circuit in the coolant-heating heat exchanger 42 by the operation of a heat pump of the refrigeration cycle 44. For this reason, air, which is blown into the vehicle interior, can be heated in the first air-heating heat exchanger 41.

Since the large-capacity third pump 13 for the engine 21 can be used to circulate a coolant in the second-third connected cooling circuit and the second pump 12 can also be used in series, a capacity for pumping a coolant is significantly improved. For this reason, even though the viscosity of a coolant is very high under a condition where the temperature of the outside air is particularly low, the coolant can be circulated. Accordingly, a temperature range in which the heat pump can operate is wide.

In this operation mode, heating capacity is improved when the first air-heating heat exchanger 41 and the coolant-heating heat exchanger 42 are disposed in series in the direction of the flow of a coolant as in the above-mentioned FIG. 18.

When the battery module 39 of the first heat exchange target device group 81 is connected to the first cooling circuit, the battery 391 can be warmed by the heat of the outside air that is absorbed in the medium-low temperature radiator 17.

Since the bypass flow passage 56I is connected to the second cooling circuit in the second heat exchange target device group 82, the adhesion of frost to the second heat exchange target device group 82, which is caused when a coolant of which the temperature is equal to or lower than the temperature of the outside air flows into the second heat exchange target device group 82, can be avoided.

Tenth Embodiment

An operation mode, which absorbs heat in the medium-low temperature radiator 17 and defrosts the engine radiator 22, will be described in a tenth embodiment.

Figure 20:
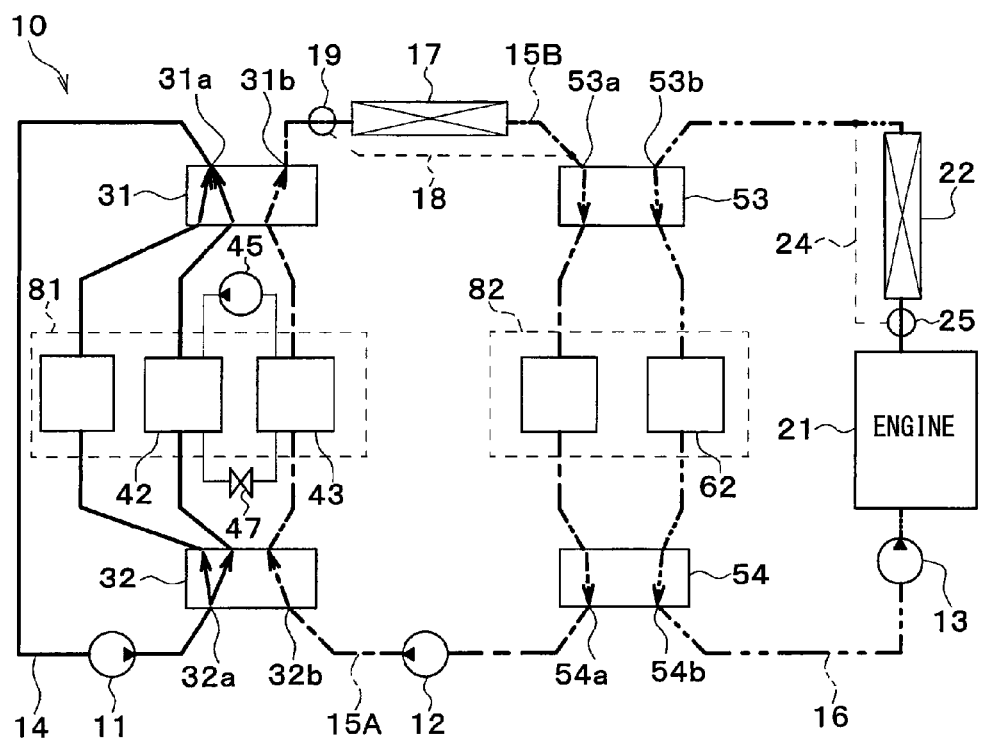
FIG. 20 is a schematic diagram showing a vehicle heat management system according to a tenth embodiment.

When it is estimated that frost adheres to the engine radiator 22, a first cooling circuit (thick solid line), a second cooling circuit (thick one-dot chain line), and a third cooling circuit (thick two-dot chain line) are formed as shown in FIG. 20.

Whether or not frost adheres to the engine radiator 22 can be estimated on the basis of, for example, the temperature of the outside air, the operating state of the refrigeration cycle 44, the temperature of a coolant, and the like.

The coolant-heating heat exchanger 42 of the first heat exchange target device group 81 is connected to the first cooling circuit, and the coolant-cooling heat exchanger 43 of the first heat exchange target device group 81 is connected to the second cooling circuit. The second heat storage device 62 or a heat generator (a device that generates heat) of the second heat exchange target device group 82 are connected to the third cooling circuit.

According to this, heat can be absorbed in the medium-low temperature radiator 17 and the heat pump can operate. Further, the temperature of a coolant of the third cooling circuit is raised by the heat supplied from the second heat storage device 62 or the heat generator, so that the frost of the engine radiator 22 can be melted.

Meanwhile, in this operation mode, there is no means for storing heat during the operation of the heat pump. Accordingly, the second heat storage device 62 can generate heat for itself and needs to have a structure that can bypass the inside.

Eleventh Embodiment

An operation mode, which absorbs heat in the engine radiator 22 and defrosts the medium-low temperature radiator 17, will be described in an eleventh embodiment.

This operation mode is performed when the second heat storage device 62 is cooled to a temperature that is equal to or lower than the temperature of the outside air. For the cooling of the second heat storage device 62 to a temperature that is equal to or lower than the temperature of the outside air, the second heat storage device 62 of the second heat exchange target device group 82 of the operation mode having been described in the ninth embodiment is connected to the second-third connected cooling circuit and the three-way valve 19 may be controlled so that a coolant flows into the bypass flow passage 18 in the second-third connected cooling circuit. Accordingly, since the coolant, which has been cooled to a temperature equal to or lower than the temperature of the outside air in the coolant-cooling heat exchanger 43, flows into the second heat storage device 62, the second heat storage device 62 can be cooled to a temperature that is equal to or lower than the temperature of the outside air.

Figure 21:
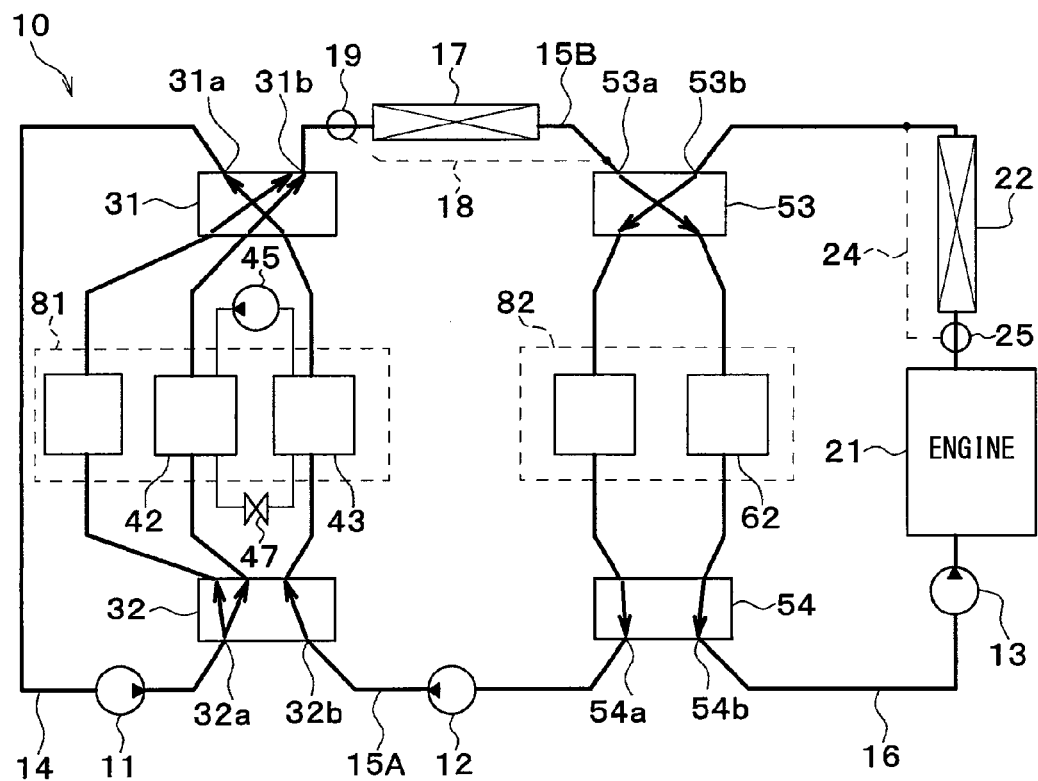
FIG. 21 is a schematic diagram showing a vehicle heat management system according to an eleventh embodiment.

When the second heat storage device 62 is cooled to a temperature that is equal to or lower than the temperature of the outside air, a first-second-third connected cooling circuit (thick solid line) is formed as shown in FIG. 21.

Accordingly, since the coolant, which has been cooled to a temperature equal to or lower than the temperature of the outside air in the second heat storage device 62, flows into the engine radiator 22, heat can be absorbed in the engine radiator 22 from the outside air and the frost of the medium-low temperature radiator 17 can be melted by the coolant that has been heated in the coolant-heating heat exchanger 42.

Moreover, since the coolant (warm water) having melted the frost of the medium-low temperature radiator 17 is used to raise the temperature of the second heat storage device 62, the coolant (warm water) is used as a heat source during the operation of the heat pump that absorbs heat in the engine radiator 22 after defrosting. Accordingly, heat energy can be effectively used.

Twelfth Embodiment

An operation mode, which defrosts the medium-low temperature radiator 17 by the heat stored in the first heat storage device, will be described in a twelfth embodiment.

Figure 22:
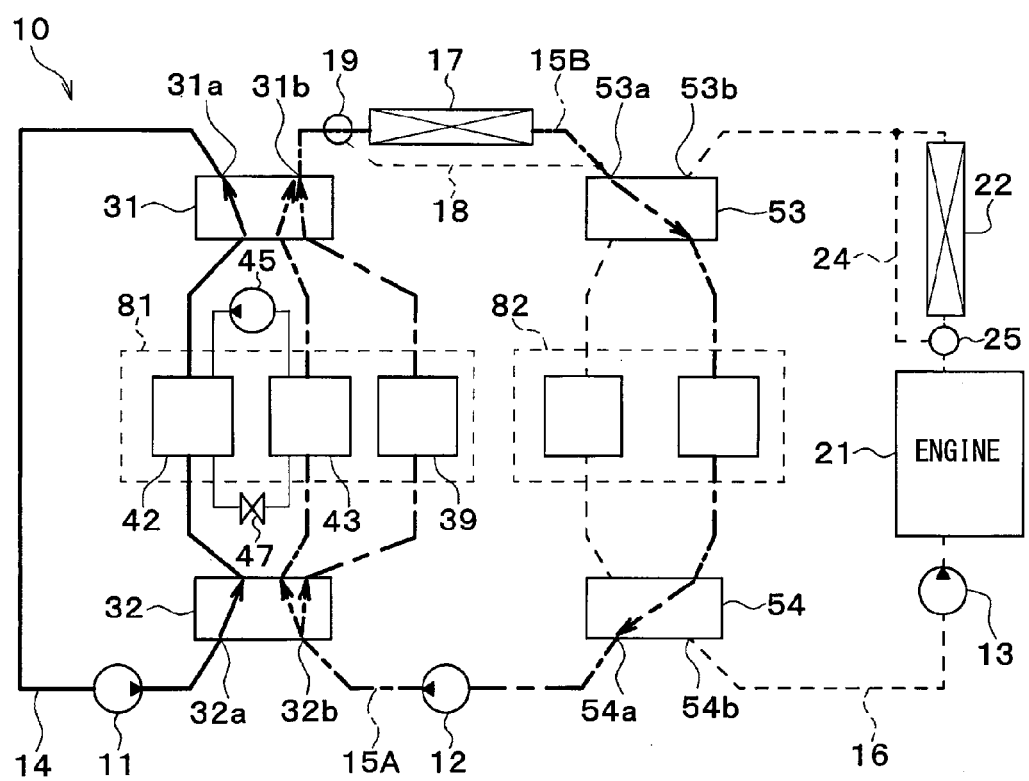
FIG. 22 is a schematic diagram showing a vehicle heat management system according to a twelfth embodiment.

When the temperature of the surface of the medium-low temperature radiator 17 falls to a temperature equal to or lower than a dew point temperature by the continuous operation of the heat pump and frost adheres to the medium-low temperature radiator 17, a first cooling circuit (thick solid line) and a second cooling circuit (thick one-dot chain line) are formed as shown in FIG. 22.

The coolant-heating heat exchanger 42 of the first heat exchange target device group 81 is connected to the first cooling circuit, and the coolant-cooling heat exchanger 43 and the first heat storage device (the battery module 39 in the example of FIG. 22) of the first heat exchange target device group 81 are connected to the second cooling circuit.

Accordingly, since the coolant (warm water), which is warmed by the heat stored in the first heat storage device (the battery module 39 in the example of FIG. 22), can be made to flow into the medium-low temperature radiator 17, a defrosting operation for melting the frost adhering to the medium-low temperature radiator 17 can be performed.

Further, since the coolant-cooling heat exchanger 43 communicates with the first heat storage device (the battery module 39 in the example of FIG. 22), heating can continue to be performed. That is, the first heat storage device (the battery module 39 in the example of FIG. 22) can be used as a heat source for defrosting and a heat sink of the heat pump.

Meanwhile, whether or not frost adheres to the medium-low temperature radiator 17 can be determined using a method of estimating the adhesion of frost from the temperature condition of the outside air and the temperature of a coolant or a method such as the combination of the estimation of the performance of the refrigeration cycle and the temperature condition of the outside air.

If a device, which discharges waste heat, (for example, the inverter 36) is connected to the second cooling circuit instead of the first heat storage device (the battery module 39 in the example of FIG. 22), a coolant flowing in the medium-low temperature radiator 17 can be warmed by the waste heat and frost adhering to the medium-low temperature radiator 17 can be melted.

Thirteenth Embodiment

An operation mode, which defrosts the engine radiator 22 by the heat stored in the first heat storage device, will be described in a thirteenth embodiment.

Figure 23:
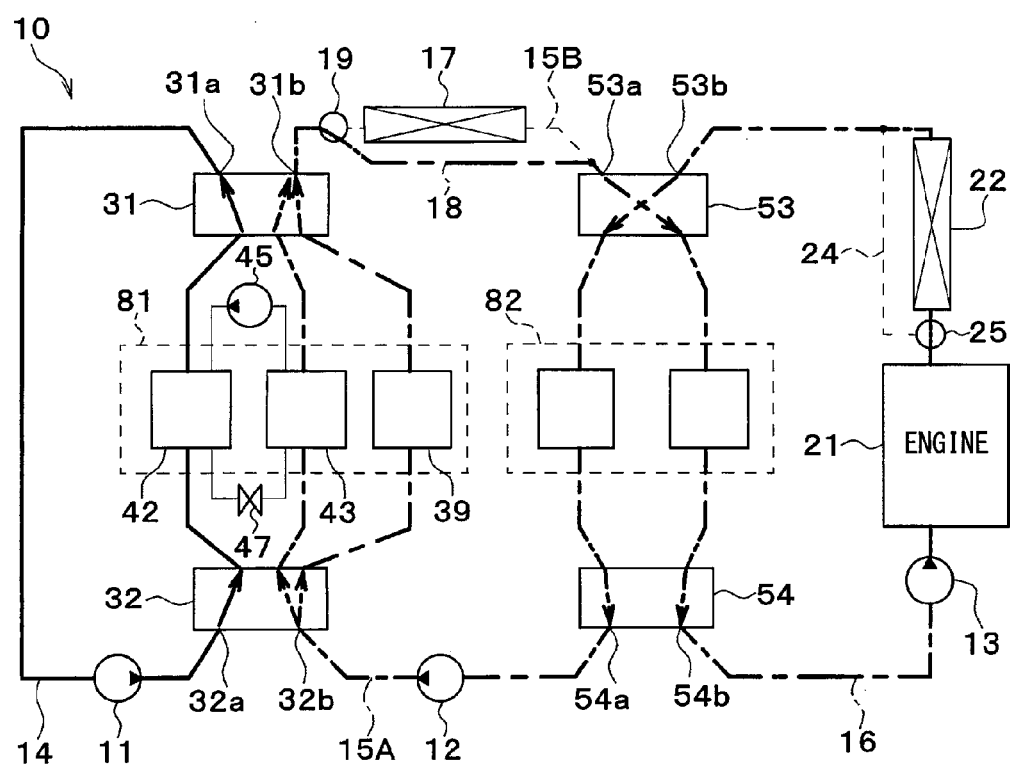
FIG. 23 is a schematic diagram showing a vehicle heat management system according to a thirteenth embodiment.

When the temperature of the surface of the engine radiator 22 falls to a temperature equal to or lower than a dew point temperature by the continuous operation of the heat pump and frost adheres to the engine radiator 22, a first cooling circuit (thick solid line) and a second-third connected cooling circuit (thick one-dot chain line) are formed as shown in FIG. 23.

The coolant-heating heat exchanger 42 of the first heat exchange target device group 81 is connected to the first cooling circuit, and the coolant-cooling heat exchanger 43 and the first heat storage device (the battery module 39 in the example of FIG. 23) of the first heat exchange target device group 81 are connected to the second cooling circuit.

Accordingly, since the coolant (warm water), which is warmed by the heat stored in the first heat storage device (the battery module 39 in the example of FIG. 23), can be made to flow into the engine radiator 22, a defrosting operation for melting the frost adhering to the engine radiator 22 can be performed.

Further, since the coolant-cooling heat exchanger 43 communicates with the first heat storage device (the battery module 39 in the example of FIG. 23), heating can continue to be performed. That is, the first heat storage device (the battery module 39 in the example of FIG. 23) can be used as a heat source for defrosting and a heat sink of the heat pump.

Meanwhile, whether or not frost adheres to the engine radiator 22 can be determined using a method of estimating the adhesion of frost from the temperature condition of the outside air and the temperature of a coolant or a method such as the combination of the estimation of the performance of the refrigeration cycle and the temperature condition of the outside air.

If a device, which discharges waste heat, (for example, the inverter 36) is connected to the second-third connected cooling circuit instead of the first heat storage device (the battery module 39 in the example of FIG. 23), a coolant flowing in the engine radiator 22 can be warmed by the waste heat and frost adhering to the engine radiator 22 can be melted.

Fourteenth Embodiment

An operation mode, which recovers cold in the first heat storage device after the vehicle has stopped, will be described in a fourteenth embodiment.

Figure 24:
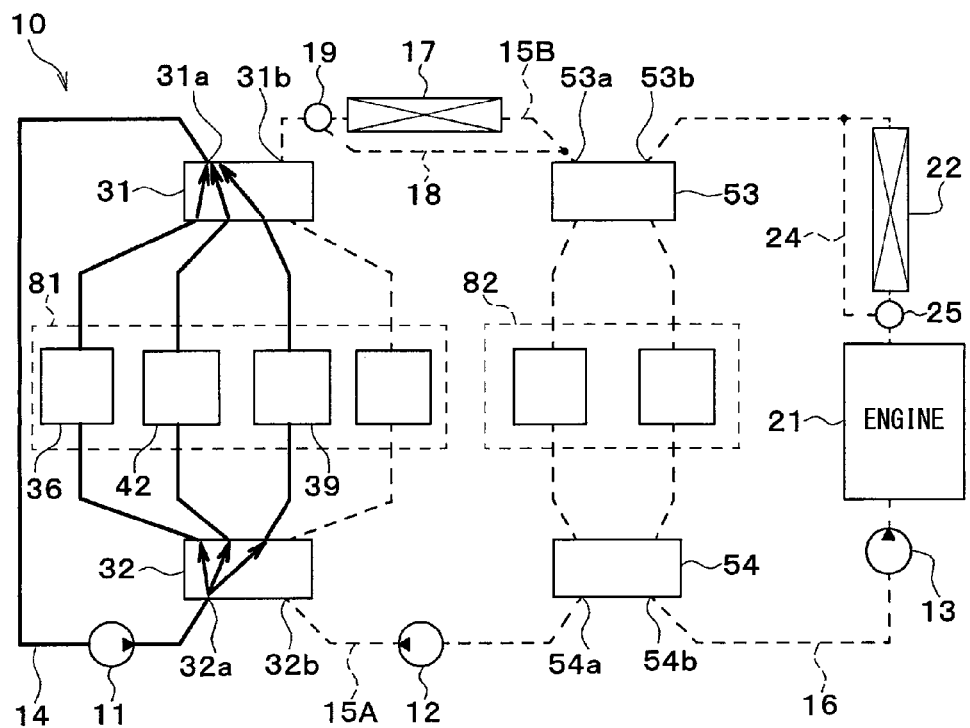
FIG. 24 is a schematic diagram showing a vehicle heat management system according to a fourteenth embodiment.

When the vehicle stops and cold is needed at the time of the next start of the vehicle, a first cooling circuit (thick solid line) is formed as shown in FIG. 24. A device that communicates with the coolant-cooling heat exchanger 43 until immediately before the stop of the vehicle and is cooled (the inverter 36 in the example of FIG. 24; hereinafter, referred to as a low-temperature device) and the first heat storage device (the battery module 39 in the example of FIG. 24) of the first heat exchange target device group 81 are connected to the first cooling circuit.

When the engine 21 stops and an occupant does not get in the vehicle, it is determined in this embodiment that the vehicle has stopped. In regard to the determination of whether or not an occupant gets in a vehicle, when a key is present outside a vehicle in a smart key system (a system that can open and close a door lock, start and stop an engine, and the like without the insertion of a key), it can be determined that an occupant has not gotten in the vehicle. If a key is an insertion type key, it can be determined that an occupant has not gotten in a vehicle when the key is removed.

Whether or not cold is needed at the time of the next start of the vehicle can be determined on the basis of the temperature condition of the outside air (25° C. or more), the estimation of a season from a date and the position of the vehicle (of which the latitude and the longitude are obtained from a GPS), the input of a switch, which can be arbitrarily selected by an occupant, or the like.

Further, the first pump 11 is operated until a difference between the temperature of the low-temperature device 36 and the temperature of the first heat storage device (the battery module 39) is equal to or smaller than a predetermined value, and a device, which needs cold, among the first heat exchange target device group 81 and the second heat exchange target device group 82 communicates with the first heat storage device at the time of the next traveling of the vehicle.

According to this, the low-temperature device 36 of which the temperature is lower than the temperature of the first heat storage device (the battery module 39) communicates with the first heat storage device when the vehicle stops. Accordingly, cold can be recovered in the first heat storage device and can be used at the time of the next start of the vehicle.

For example, the cooling of the heat exchange target device can be assisted at the time of the next start of the vehicle by using the cold that is recovered in the first heat storage device.

For example, if the coolant-refrigerant heat exchanger 40 is installed on the path of the first heat storage device (the battery module 39), the refrigerant of the refrigeration cycle 44 is supercooled in the coolant-refrigerant heat exchanger 40 at the time of the next start of the vehicle by using the cold that is recovered in the first heat storage device. Accordingly, cooling can be assisted. As a result, an effect of improving fuel efficiency by increasing a distance-to-empty in a traveling mode (EV mode) where the vehicle travels by using only the vehicle-running electric motor without using the engine 21 or by reducing the power of the cooling device can be obtained.

Meanwhile, if low-temperature devices communicate with the first heat storage device in turns in order of temperature from high to low when multiple devices (low-temperature devices) of which the temperatures are lower than the temperature of the first heat storage device are present after the vehicle has stopped, cold can be efficiently recovered from multiple devices having different temperature zones and can be stored.

The low-temperature device 36 and the first heat storage device (the battery module 39) are connected to the first cooling circuit and the first pump 11 operates in the example of FIG. 24. However, the low-temperature device 36 and the first heat storage device may be connected to the second cooling circuit or the third cooling circuit and the second pump 12 or the third pump 13 may operate.

Fifteenth Embodiment

An operation mode, which recovers heat in the first heat storage device after the vehicle has stopped, will be described in a fifteenth embodiment.

Figure 25:
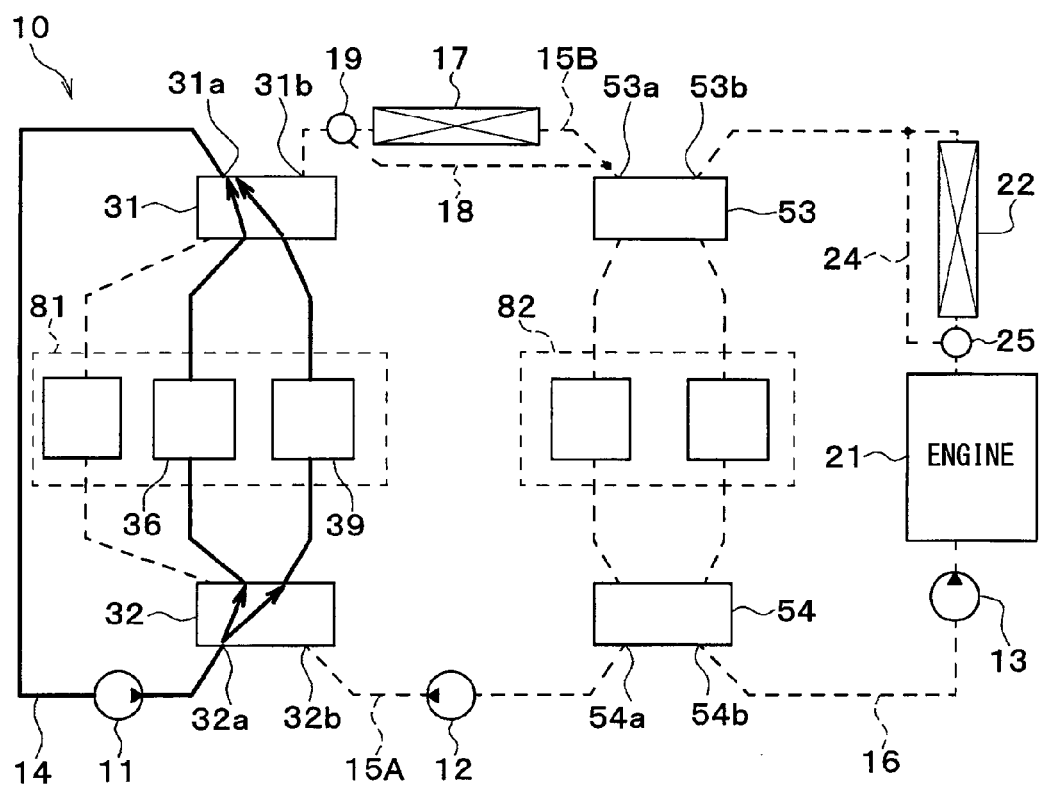
FIG. 25 is a schematic diagram illustrating a pre-heat recovery mode of a vehicle heat management system according to a fifteenth embodiment.
Figure 26:
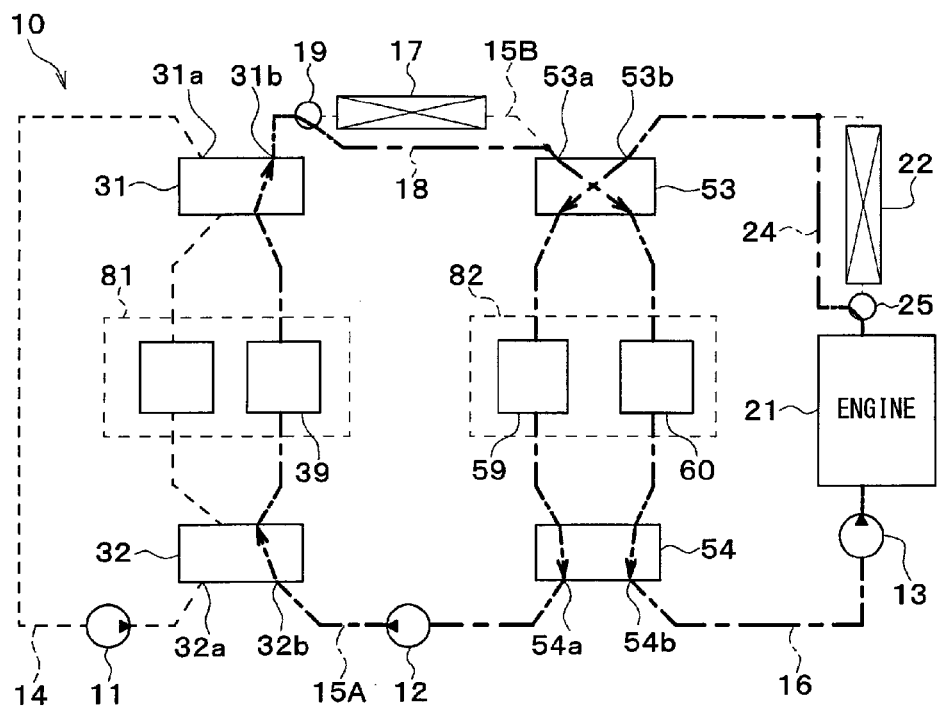
FIG. 26 is a schematic diagram illustrating a heat recovery mode of the vehicle heat management system according to the fifteenth embodiment.

When the vehicle stops and heat is needed at the time of the next start of the vehicle, a pre-heat recovery mode illustrated in FIG. 25 is performed first and a heat recovery mode illustrated in FIG. 26 is then performed. Whether or not heat is needed at the time of the next start of the vehicle can be determined on the basis of the temperature condition of the outside air (25° C. or less), the estimation of a season from a date and the position of the vehicle (of which the latitude and the longitude are obtained from a GPS), the input of a switch, which can be arbitrarily selected by an occupant, or the like.

In the pre-heat recovery mode, a first cooling circuit (thick solid line) is formed as shown in FIG. 25. A heat exchange target device of which the temperature is slightly higher than the temperature of the outside air (the inverter 36 in the example of FIG. 25; hereinafter, referred to as a high-temperature device) and the first heat storage device (the battery module 39 in the example of FIG. 25) of the first heat exchange target device group 81 are connected to the first cooling circuit. In addition, the first pump 11 is operated. Accordingly, heat is recovered from the heat exchange target device of which the temperature is slightly higher than the temperature of the outside air.

In the heat recovery mode, a second-third connected cooling circuit (thick one-dot chain line) is formed as shown in FIG. 26. The first heat storage device (the battery module 39 in the example of FIG. 26) of the first heat exchange target device group 81 is connected to the second-third connected cooling circuit, and the heat exchange target devices, of which the temperatures are higher than the temperature of the heat exchange target device from which heat has been recovered in the pre-heat recovery mode, (the supercharger 59 and the exhaust-gas-cooling heat exchanger 60 in the example of FIG. 26) of the second heat exchange target device group 82 are connected to the second-third connected cooling circuit.

Further, at least one of the second and third pumps 12 and 13 is operated until a difference between the temperature of the high-temperature device 36 and the temperature of the first heat storage device is equal to or smaller than a predetermined value.

Accordingly, heat is recovered from the heat exchange target devices, of which the temperatures are higher than the temperature of the heat exchange target device from which heat has been recovered in the pre-heat recovery mode, (the supercharger 59 and the exhaust-gas-cooling heat exchanger 60 in the example of FIG. 26).

That is, first, heat is recovered from the device, which has a low temperature zone, (the inverter 36 in the example of FIG. 25) in the pre-heat recovery mode and the temperature of the first heat storage device (the battery module 39 in the example of FIG. 25) is raised. Then, heat is recovered from the devices that have a high temperature zone (the supercharger 59 and the exhaust-gas-cooling heat exchanger 60 in the example of FIG. 26). Accordingly, heat can be efficiently stored from multiple devices having different temperature zones. A device, which needs heat, among the first heat exchange target device group 81 and the second heat exchange target device group 82 communicates with the first heat storage device at the time of the next traveling of the vehicle. For example, the heating of the heat exchange target device can be assisted at the time of the next start of the vehicle by using the heat that is recovered in the first heat storage device.

When the engine 21 is not used and the temperature of a coolant in the engine 21 is low, the heat recovery mode is not performed.

Further, a heat exchange target device of which the temperature is slightly higher than the temperature of the outside air may not be present in some operation modes performed immediately before the stop of the vehicle. In this case, the pre-heat recovery mode is not performed and only the heat recovery mode is performed.

The high-temperature device 36 and the first heat storage device (the battery module 39) are connected to the first cooling circuit and the first pump 11 operates in the example of FIG. 25, and the high-temperature device 36 and the first heat storage device are connected to the second-third connected cooling circuit and at least one of the second and third pumps 12 and 13 operates in the example of FIG. 26. However, the low-temperature device 36 and the first heat storage device may be connected to the other cooling circuit and the other pump may operate.

Sixteenth Embodiment

Figure 27:
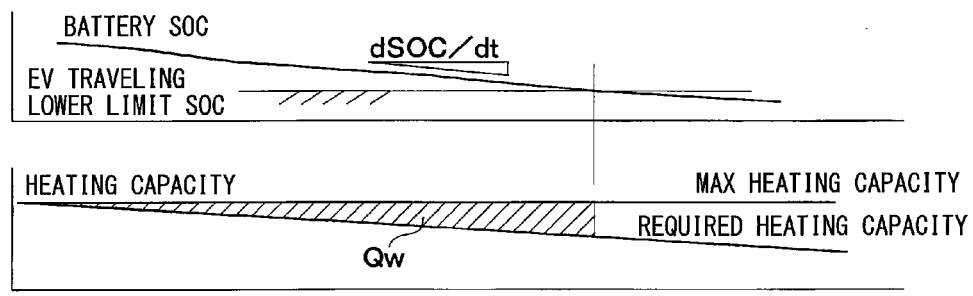
FIG. 27 is an operating time chart of a vehicle heat management system according to a sixteenth embodiment.

An operation mode, which performs the pre-warm-up of the engine so that the temperature of a coolant for the engine becomes a predetermined temperature in the timing of the start-up of the engine 21 at the time of the traveling mode (EV mode) where the vehicle travels by using only the vehicle-running electric motor without using the engine 21, will be described in a sixteenth embodiment. An operating time chart of this embodiment is shown in FIG. 27.

For example, when the engine 21 stops and the temperature of a coolant flowing in the flow passage 16 for the third pump is equal to or lower than a predetermined temperature, the state of the heat management system is switched to the above-mentioned second state shown in FIG. 8. Accordingly, a coolant flowing in the second-third connected cooling circuit can be cooled in two radiators, that is, the medium-low temperature radiator 17 and the engine radiator 22.

In this state, a rate of decrease in the state of charge SOC of the battery 391 (battery SOC) is determined and engine pre-warm-up start timing (bypass switching timing) is determined in consideration of time required for the pre-warm-up of the engine (time required to warm up the engine 21 to a predetermined temperature).

Specifically, time Twu required for the pre-warm-up of the engine, which is shown in the following equation F1, and time Tsoc taken until an EV traveling lower limit (time taken until engine start-up timing), which is shown in the following equation F2, are calculated; the pre-warm-up of the engine is not performed while "Twu<Tsoc" is satisfied; and the pre-warm-up of the engine is started when "Twu=Tsoc" is satisfied. Specifically, the three-way valves 19 and 25 are controlled so that a coolant flows into the bypass flow passages 18 and 24 in the second-third connected cooling circuit; and the pre-warm-up of the engine is performed.

$$Twu=(Twt-Tw0) \times Vw \times Cp \times \rho / Qw \qquad \text{F1}$$

Here, Tw0 denotes the initial temperature of a coolant, Twt denotes the required temperature of a coolant (temperature at the time of completion of the pre-warm-up of the engine), Vw denotes the volume of a coolant (corresponding to a warm-up circuit), Cp denotes the specific heat of a coolant, ρ denotes the density of a coolant, and Qw denotes the amount of heat applied to a coolant per unit time.

$$Tsoc=SOCc-SOCcr/(dSOC/dt) \qquad \text{F2}$$

Here, SOCc denotes the present SOC, and SOCcr denotes SOC at the EV traveling lower limit.

According to this, a coolant flows into the bypass flow passages 18 and 24 in the second-third connected cooling circuit during the pre-warm-up of the engine. Accordingly, the heat of the coolant of the second-third connected cooling circuit is prevented from being radiated to the outside air at the medium-low temperature radiator 17 and the engine radiator 22, so that the engine 21 can be efficiently warmed up.

Meanwhile, to give a margin to the time for the pre-warm-up of the engine, the pre-warm-up of the engine may be started when "Twu+α=Tsoc" is satisfied.

Seventeenth Embodiment

Figure 28:
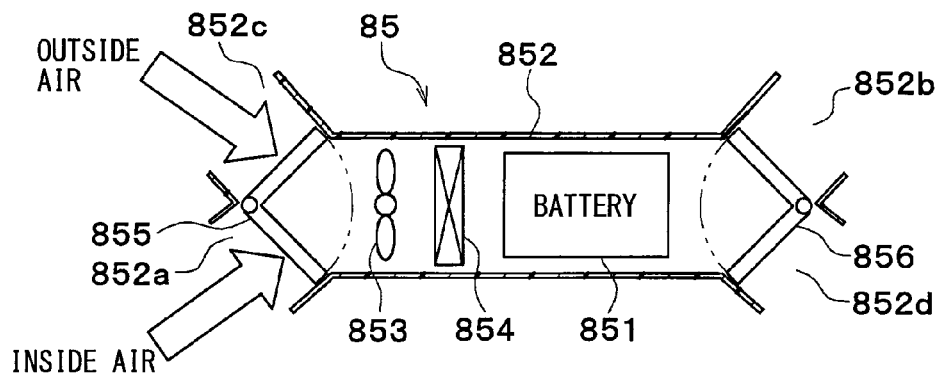
FIG. 28 is a schematic view illustrating a heat-retaining mode of a vehicle heat management system according to a seventeenth embodiment.

In the above-mentioned embodiments, the air passage in which blown air flows so as to make a U-turn is formed in the casing 392 of the battery module 39. However, in a seventeenth embodiment, an air passage in which blown air flows linearly is formed in a casing 852 of a battery module 85 as shown in FIG. 28. The battery module 85 may be used as an example of the first heat storage device.

The casing 852 of the battery module 85 forms an air passage in which air blown from an air blower 853 flows. Inside air inlet ports 852a and 852b through which inside air is introduced are formed at the casing 852.

The battery 851 is disposed in the casing 852 at the substantially middle portion of the casing 852. The inside air inlet ports 852a and 852b are formed at both end portions of the casing 852. The substantially middle portion of the casing 852 where the battery 851 is disposed is made of a heat insulating material. Accordingly, the battery module 85 has a heat-retaining structure that stores heat and cold in the battery 851.

The air blower 853 is disposed in the casing 852 so as to be closer to one end (the left end in FIG. 28) of the casing than the battery 851. The air blower 853 can perform two types of operations, that is, an operation for blowing air from one inside air inlet port 852a toward the other inside air inlet port 852b and an operation for blowing air in a reverse direction.

An air passage (not shown) in which air flows is formed in the battery 851. The battery 851 is cooled or heated by heat exchange between air, which flows in the battery 851, and itself. The air passage formed in the battery 851 extends from one inside air inlet port 852a toward the other inside air inlet port 852b.

Two air outlets 852c and 852d through which the outside air is discharged are formed at the casing 852. One air outlet 852c is adjacent to one inside air inlet port 852a, and the other air outlet 852d is adjacent to the other inside air inlet port 852b.

A battery heat exchanger 854 is disposed between the battery 851 and the air blower 853 in the casing 852. The battery heat exchanger 854 performs heat exchange between blown air and a coolant.

Two air passage switching doors 855 and 856 are disposed in the casing 852. The first air passage switching door 855 is a V-shaped door that is switched so as to open or close the inside air inlet port 852a or the air outlet 852c. The second air passage switching door 856 is a V-shaped door that is switched so as to open or close the inside air inlet port 852b or the air outlet 852d.

The operations of electric actuators, which rotationally drive the two air passage switching doors 855 and 856, are controlled by the controller 70.

The battery module 85 is switched to four modes, that is, a heat-retaining mode, a heat storage mode, a cold storage mode, and a recovery mode by operations for rotating the two air passage switching doors 855 and 856.

The two air passage switching doors 855 and 856 close all of the inside air inlet ports 852a and 852b and the air outlets 852c and 852d by being rotated to the positions of FIG. 28 in the heat-retaining mode.

Accordingly, the flow of both inside air and outside air is blocked in the air passage formed in the casing 852. Accordingly, heat generated by the battery 851 is stored in the battery 851. Meanwhile, it is preferable that the flow of the coolant to the battery heat exchanger 854 also be blocked in the heat-retaining mode for the efficient storage of heat in the battery 851.

Figure 29:
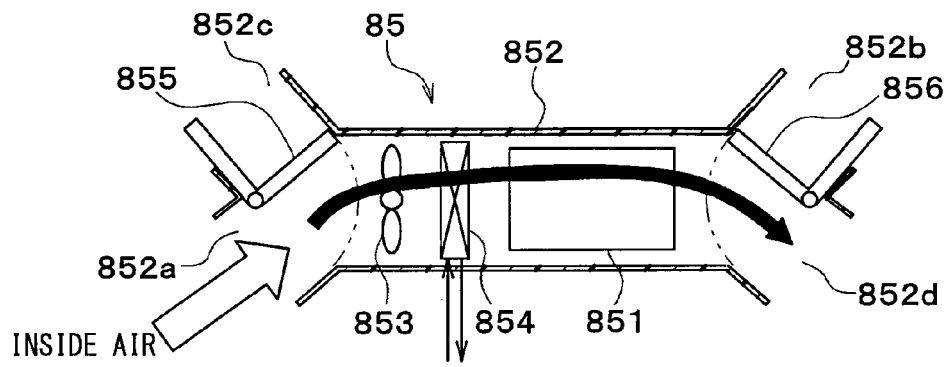
FIG. 29 is a schematic view illustrating the heat-retaining mode of the vehicle heat management system according to the seventeenth embodiment.

The heat storage mode is performed mainly when the temperature of outside air in winter is low (when the temperature of outside air is low). In the heat storage mode, as shown in FIG. 29, the first air passage switching door 855 opens the inside air inlet port 852a and closes the air outlet 852c and the second air passage switching door 856 closes the inside air inlet port 852b and opens the air outlet 852d. The air blower 853 blows air to the other inside air inlet port 852b from one inside air inlet port 852a.

Accordingly, after inside air introduced from the inside air inlet port 852a flows into the battery heat exchanger 854 and the battery 851 in this order, the inside air is discharged from the air outlet 852d.

At this time, the coolant, which has been heated in the coolant-heating heat exchanger 42 or the like, flows into the battery heat exchanger 854. Accordingly, since inside air heated in the battery heat exchanger 854 flows into the battery 851, heat is stored in the battery 851.

The cold storage mode is performed mainly when the temperature of outside air in summer is high (when the temperature of outside air is high). In the cold storage mode, the two air passage switching doors 855 and 856 are rotated as in the heat storage mode illustrated in FIG. 29 and the air blower 853 is operated as in the heat storage mode illustrated in FIG. 29.

Accordingly, after inside air introduced from the inside air inlet port 852a flows into the battery heat exchanger 854 and the battery 851 in this order, the inside air is discharged from the air outlet 852d.

At this time, the coolant, which has been cooled in the coolant-cooling heat exchanger 43, flows into the battery heat exchanger 854. Accordingly, since inside air cooled in the battery heat exchanger 854 flows in the battery 851, cold is stored in the battery 851.

The recovery mode is performed after the heat storage mode or the cold storage mode is performed, that is, when heat or cold is stored in the battery 851.

Figure 30:
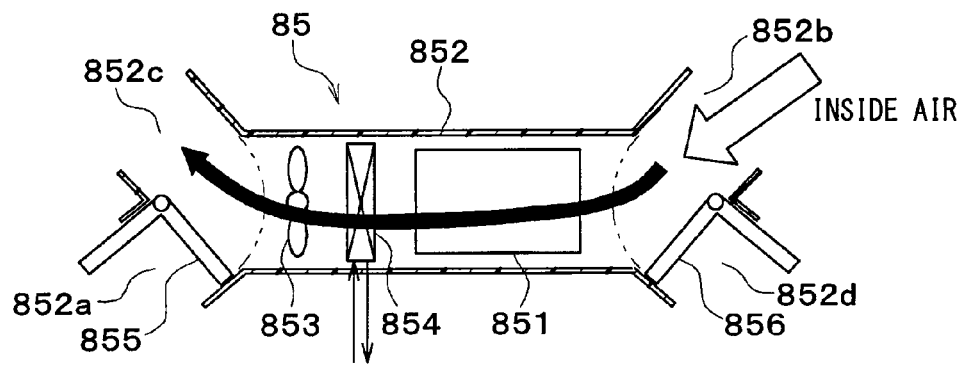
FIG. 30 is a schematic view illustrating the heat-retaining mode of the vehicle heat management system according to the seventeenth embodiment.

In the recovery mode, as shown in FIG. 30, the first air passage switching door 855 closes the inside air inlet port 852a and opens the air outlet 852c and the second air passage switching door 856 opens the inside air inlet port 852b and closes the air outlet 852d. The air blower 853 blows air toward one inside air inlet port 852a from the other inside air inlet port 852b in contrast to the direction of air flow in the heat storage mode and the cold storage mode illustrated in FIG. 31.

Accordingly, after inside air introduced from the inside air inlet port 852b flows into the battery 851 and the battery heat exchanger 854 in this order, the inside air is discharged from the air outlet 852c.

At this time, when heat is stored in the battery 851, the coolant, which has been cooled in the coolant-cooling heat exchanger 43, flows into the battery heat exchanger 854. Accordingly, since inside air heated in the battery 851 flows into the battery heat exchanger 854, heat stored in the battery 851 can be recovered by the coolant.

Meanwhile, when cold is stored in the battery 851, the coolant, which has been heated in the coolant-heating heat exchanger 42 or the like, flows into the battery heat exchanger 854. Accordingly, since inside air cooled in the battery 851 flows into the battery heat exchanger 854, cold stored in the battery 851 can be recovered by the coolant.

According to this embodiment, the same effects as the effects of the fourth embodiment can be obtained.

Eighteenth Embodiment

Figure 31:
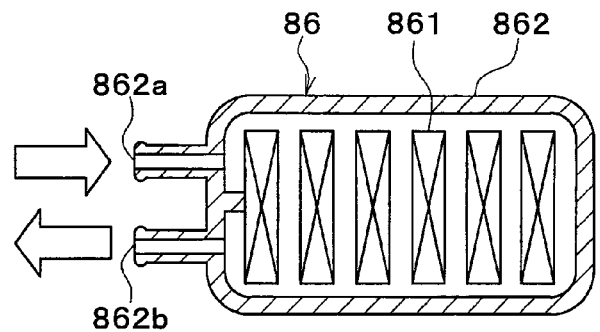
FIG. 31 is a schematic cross-sectional view of a battery module of an eighteenth embodiment.

In the above-mentioned embodiments, the battery modules 39 and 85 exchange heat between the batteries 391 and 851 and a coolant through blown air. However, in an eighteenth embodiment, a battery module 86 performs heat exchange directly between a battery 861 and a coolant as shown in FIG. 31. The battery module 86 may be used as an example of the first heat storage device.

The battery module 86 includes the battery 861 and a tank 862. The battery 861 includes multiple battery cells and the like, and is received in the tank 862.

An inlet 862a and an outlet 862b for a coolant are formed at the tank 862. A coolant flowing in from the inlet 862a flows into the inner space of the tank 862 and flows out of the outlet 862b.

The coolant flowing in the inner space of the tank 862 exchanges heat with the battery 861, so that the battery 861 is cooled or heated.

The tank 862 is made of a material having a heat insulating property. For this reason, the battery module 86 can store heat and cold by using the heat capacity of the battery 861. In other words, the battery module 86 can be used as a heat reservoir.

Nineteenth Embodiment

Figure 32:
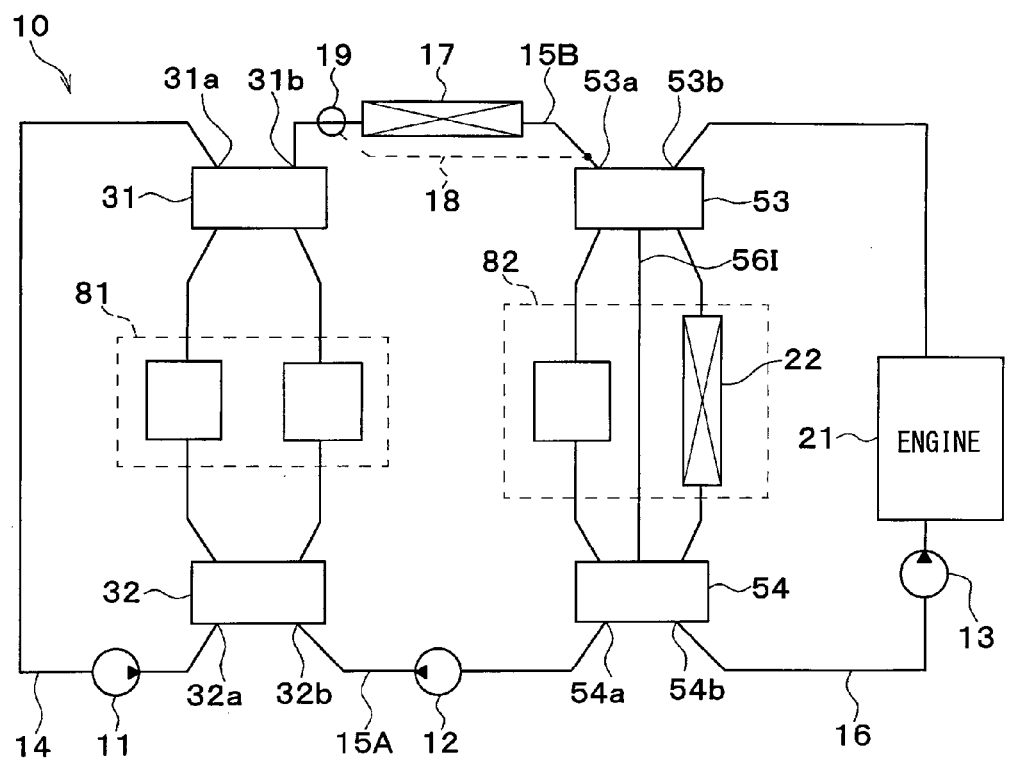
FIG. 32 is a schematic diagram showing a vehicle heat management system according to a nineteenth embodiment.

In the first to eighteenth embodiments, the engine radiator 22 is disposed on the flow passage 16 for the third pump. However, in a nineteenth embodiment, the engine radiator 22 (a second-flow-passage-group radiator) is included in the second heat exchange target device group 82 as shown in FIG. 32.

According to this, the bypass flow passage 18 and the three-way valve 19 can be omitted. Further, when heat is absorbed in the engine radiator 22, a low-temperature coolant having been cooled in the coolant-cooling heat exchanger 43 may not pass through the engine 21.

Twentieth Embodiment

Figure 33:
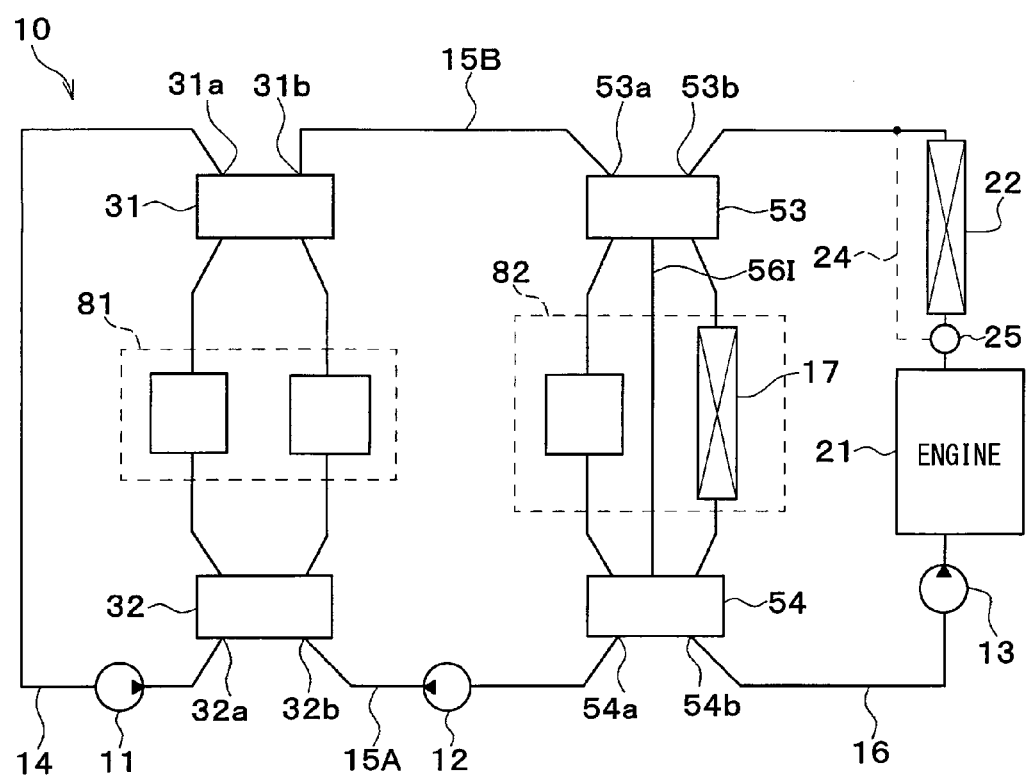
FIG. 33 is a schematic diagram showing a vehicle heat management system according to a twentieth embodiment.

In the first to eighteenth embodiments, the medium-low temperature radiator 17 is disposed on the flow passage 15A for the second pump. However, in a twentieth embodiment, the medium-low temperature radiator 17 (a second-flow-passage-group radiator) is included in the second heat exchange target device group 82 as shown in FIG. 33.

According to this, the bypass flow passage 18 and the three-way valve 19 can be omitted. Further, cooling corresponding to a medium-low temperature is performed by using the heat storage device, and an operation for significantly improving the cooling performance of the engine 21 by connecting the engine radiator 22 to the medium-low temperature radiator 17 in series during the cooling corresponding to a medium-low temperature can be performed.

Twenty-First Embodiment

Figure 34:
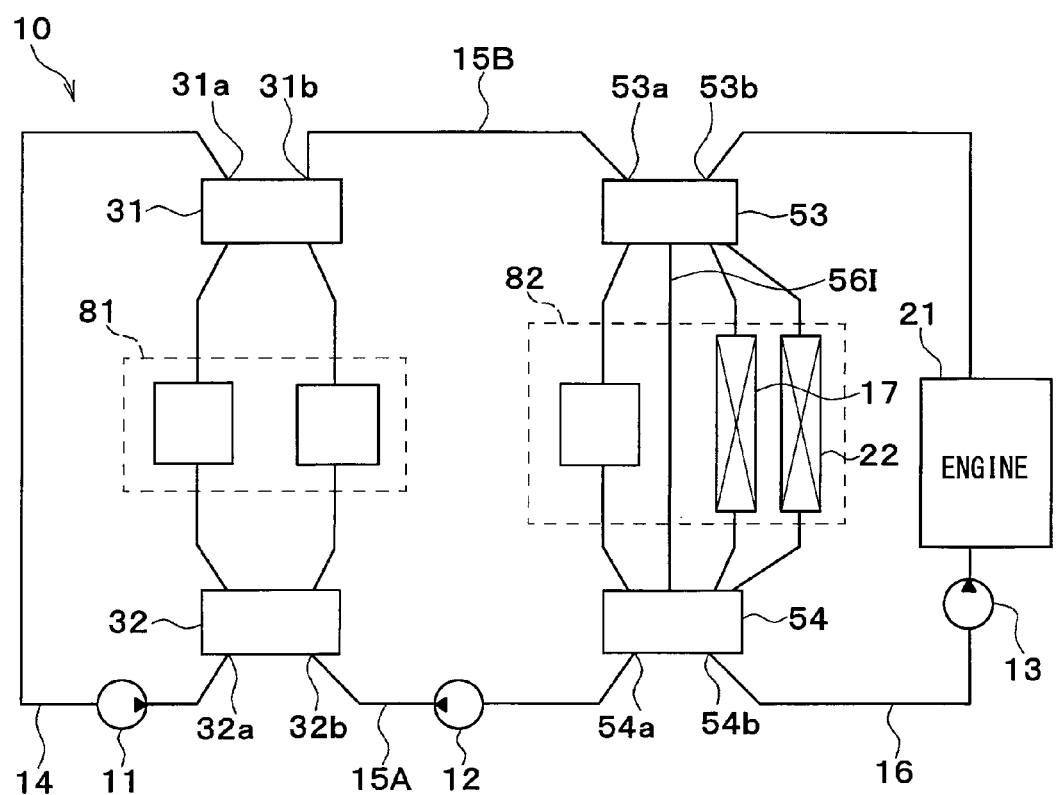
FIG. 34 is a schematic diagram showing a vehicle heat management system according to a twenty-first embodiment.

In the first to eighteenth embodiments, the medium-low temperature radiator 17 is disposed on the flow passage 15A for the second pump and the engine radiator 22 is disposed on the flow passage 16 for the third pump. However, in a twenty-first embodiment, the medium-low temperature radiator 17 (a second-flow-passage-group radiator) and the engine radiator 22 (a second-flow-passage-group radiator) are included in the second heat exchange target device group 82 as shown in FIG. 34.

According to this, the bypass flow passages 18 and 24 and the three-way valves 19 and 25 can be omitted. Further, when heat is absorbed in the engine radiator 22, a low-temperature coolant having been cooled in the coolant-cooling heat exchanger 43 may not pass through the engine 21.

Furthermore, the cooling of a device, of which the allowable temperature is a medium-low temperature, is performed in the first cooling circuit by using the heat storage device, and an operation for significantly improving the cooling performance of the engine 21 by connecting the engine radiator 22 to the medium-low temperature radiator 17 in series during the cooling of the device can be performed.

Twenty-Second Embodiment

Figure 35:
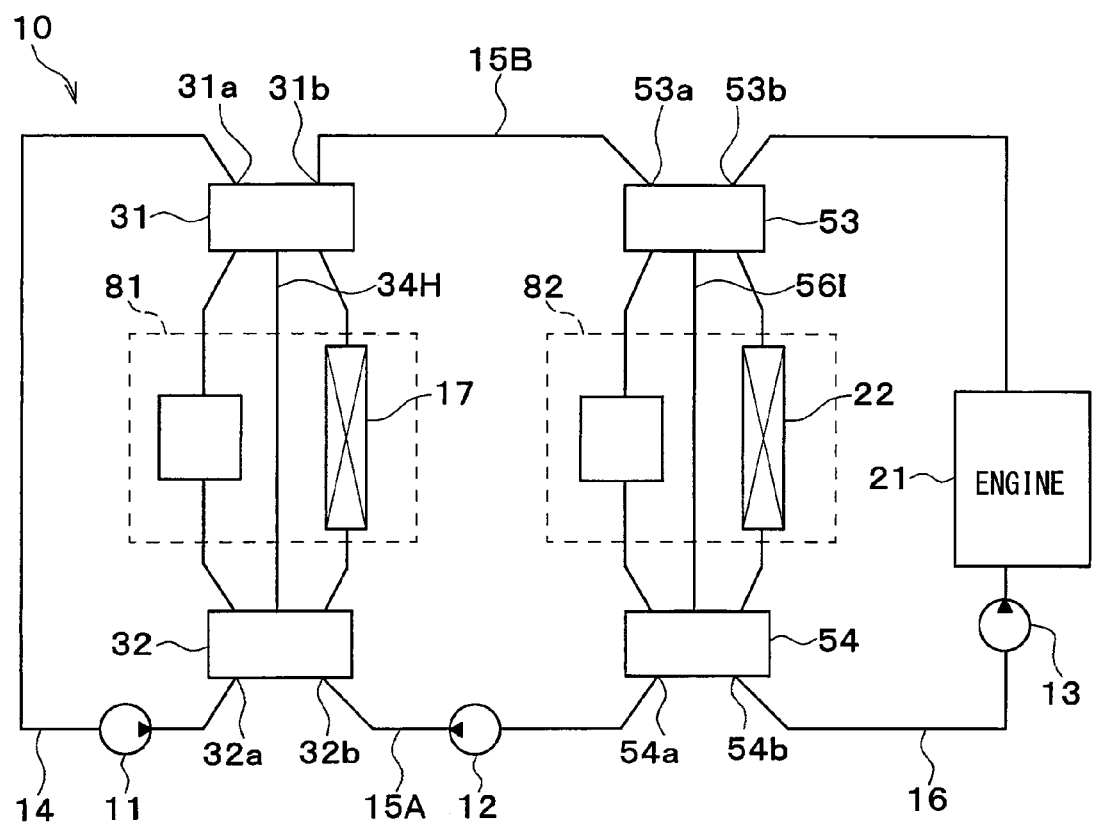
FIG. 35 is a schematic diagram showing a vehicle heat management system according to a twenty-second embodiment.

In the first to eighteenth embodiments, the medium-low temperature radiator 17 is disposed on the flow passage 15A for the second pump and the engine radiator 22 is disposed on the flow passage 16 for the third pump. However, in a twenty-second embodiment, the medium-low temperature radiator 17 (a first-flow-passage-group radiator) is included in the first heat exchange target device group 81 and the engine radiator 22 (a second-flow-passage-group radiator) is included in the second heat exchange target device group 82 as shown in FIG. 35.

According to this, the bypass flow passages 18 and 24 and the three-way valves 19 and 25 can be omitted. Further, when heat is absorbed in the engine radiator 22, a low-temperature coolant having been cooled in the coolant-cooling heat exchanger 43 may not pass through the engine 21.

Furthermore, when heat is absorbed in one of the medium-low temperature radiator 17 and the engine radiator 22, the other radiator can be easily defrosted.

Moreover, the coolant of the first cooling circuit can be cooled in the medium-low temperature radiator 17 without depending on the coolant-cooling heat exchanger 43. In addition, while the engine 21 stops, the coolant of the second cooling circuit can be cooled in the engine radiator 22.

Twenty-Third Embodiment

Figure 36:
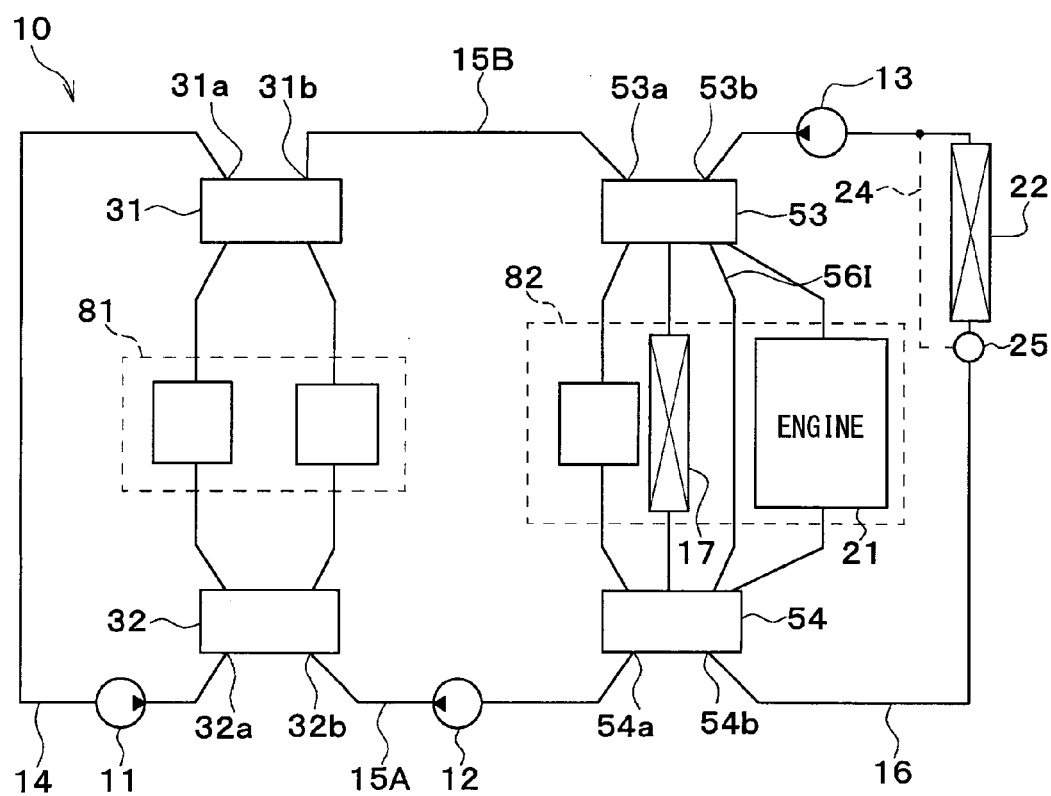
FIG. 36 is a schematic diagram showing a vehicle heat management system according to a twenty-third embodiment.

In the first to eighteenth embodiments, the medium-low temperature radiator 17 is disposed on the flow passage 15A for the second pump and the engine 21 is disposed on the flow passage 16 for the third pump. However, in a twenty-third embodiment, the medium-low temperature radiator 17 (a second-flow-passage-group radiator) and the engine 21 are included in the second heat exchange target device group 82 as shown in FIG. 36.

According to this, the bypass flow passage 18 and the three-way valve 19 can be omitted. Further, a serialization mode, which is to be performed when the failure of the pump occurs, can also be performed even when the engine 21 is warmed (only when the engine 21 stops).

Further, when heat is absorbed in the engine radiator 22, a low-temperature coolant having been cooled in the coolant-cooling heat exchanger 43 may not pass through the engine 21. Further, cooling corresponding to a medium-low temperature is performed by using the heat storage device, and an operation for significantly improving the cooling performance of the engine 21 by connecting the engine radiator 22 to the medium-low temperature radiator 17 in series during the cooling corresponding to a medium-low temperature can be performed.

The present disclosure is not limited to the above-mentioned embodiments, and may have various modifications as described below.

(1) Various devices can be used as the heat exchange target device. For example, a heat exchanger, which is built into a seat on which an occupant is to sit and cools and heats the seat by a coolant, may be used as a device that is to be subjected to heat exchange. As long as multiple (two or more) heat exchange target devices are provided, the number of the heat exchange target devices is not limited.

(2) In each of the above-mentioned embodiments, heat exchange capacity for the heat exchange target device may be controlled by the intermittent circulation of a coolant in the heat exchange target device.

(3) In the above-mentioned embodiments, the coolant-cooling heat exchanger 43, which cools a coolant by a low-pressure refrigerant of the refrigeration cycle 44, is used as cooling means for cooling a coolant. However, a Peltier element may be used as the cooling means.

(4) A coolant is used as a heat transfer medium in each of the above-mentioned embodiments, but various media such as oil may be used as the heat transfer medium.

(5) Nanofluid may be used as a coolant (heat transfer medium). The nanofluid is fluid with which nanoparticles having a diameter of the order of nanometers are mixed. When nanoparticles are mixed with a coolant, the following effects can be obtained in addition to an effect of lowering a freezing point like a coolant using ethylene glycol (so-called antifreeze).

That is, an effect of improving thermal conductivity in a specific temperature zone, an effect of increasing the heat capacity of a coolant, an effect of preventing the corrosion of a metal pipe, an effect of preventing the degradation of a rubber pipe, and an effect of increasing the fluidity of a coolant at an extremely low temperature can be obtained.

These effects are variously changed according to the structure, the shape, and the mixing ratio of the nanoparticles and additives.

According to this, thermal conductivity can be improved. Accordingly, even though an amount of coolant less than a coolant using ethylene glycol is used, equivalent cooling efficiency can be obtained.

Further, since the heat capacity of a coolant can be increased, the amount of cold stored in a coolant and the amount of heat stored in a coolant (cold and heat stored using sensible heat) can be increased.

It is preferable that the aspect ratio of the nanoparticle be 50 or more. The reason for this is that sufficient thermal conductivity can be obtained. Meanwhile, an aspect ratio is a shape index that shows a ratio of the vertical size of the nanoparticle to the horizontal size thereof.

A nanoparticle, which contains any of Au, Ag, Cu, and C, can be used as the nanoparticle. Specifically, an Au nanoparticle, an Ag nanowire, CNT (carbon nano-tube), graphene, a graphite core-shell type nanoparticle (a particle having a structure, such as a carbon nano-tube, so as to surround the atoms), CNT containing Au nanoparticles, and the like can be used as the constituent atoms of the nanoparticle.

(6) A chlorofluorocarbon refrigerant is used as the refrigerant in the refrigeration cycle 44 of each of the above-mentioned embodiments. However, the type of the refrigerant is not limited thereto, and a natural refrigerant, such as carbon dioxide, a hydrocarbon-based refrigerant, and the like may be used as the refrigerant.

Further, the refrigeration cycle 44 of each of the above-mentioned embodiments forms a subcritical refrigeration cycle of which high pressure-side refrigerant pressure does not exceed the critical pressure of a refrigerant, but may form a supercritical refrigeration cycle of which high pressure-side refrigerant pressure exceeds the critical pressure of a refrigerant.

(7) An example in which a cooling system for a vehicle of this disclosure is applied to a hybrid vehicle has been described in each of the above-mentioned embodiments. However, this disclosure may be applied to an electric vehicle that is not provided with an engine and obtains a drive force for the traveling of a vehicle from a vehicle-running electric motor, a fuel cell vehicle that uses a fuel cell as means for generating energy for traveling, and the like.

The invention claimed is:

1. A vehicle heat management system comprising:
   a first pump and a second pump that suck a heat transfer medium and discharge the heat transfer medium;
   a first path in which the heat transfer medium flows and the first pump is disposed;

a second path in which the heat transfer medium flows and the second pump is disposed;

a first flow passage group that includes flow passages in which the heat transfer medium flows;

a first switching valve to which an inlet side of the first path and an inlet side of the second path are connected in parallel and to which outlet sides of the flow passages of the first flow passage group are connected in parallel, wherein the first switching valve switches communication states of the flow passages of the first flow passage group individually between a state communicating with the first path and a state communicating with the second path; and a second switching valve to which an outlet side of the first path and an outlet side of the second path are connected in parallel and to which inlet sides of the flow passages of the first flow passage group are connected in parallel, wherein the second switching valve switches communication states of the flow passages of the first flow passage group individually between a state communicating with the first path and a state communicating with the second path, wherein the first switching valve and the second switching valve operate in conjunction with each other, when a first predetermined condition is satisfied, each of the flow passages of the first flow passage group communicates with either the first path or the second path to provide a heat transfer medium circuit including the first path and a heat transfer medium circuit including the second path which are independent from each other, when a second predetermined condition is satisfied, each of the flow passages of the first flow passage group communicates with both the first path and the second path to provide a heat transfer medium circuit in which the first path communicates with the second path in series;

the second path includes a flow passage connected to the first switching valve and a flow passage connected to the second switching valve, the vehicle heat management system further comprising:

a third pump that sucks the heat transfer medium and discharges the heat transfer medium;

a third path in which the heat transfer medium flows and the third pump is disposed;

a second flow passage group that includes flow passages in which the heat transfer medium flows;

a third switching valve to which an outlet side of the flow passage of the second path connected to the first switching valve and an outlet side of the third path are connected in parallel and to which inlet sides of the flow passages of the second flow passage group are connected in parallel, wherein the third switching valve switches communication states of the flow passages of the second flow passage group individually between a state communicating with the second path and a state communicating with the third path; and a fourth switching valve to which an inlet side of the flow passage of the second path connected to the second switching valve and an inlet side of the third path are connected in parallel and to which outlet sides of the flow passages of the second flow passage group are connected in parallel, wherein the fourth switching valve switches communication states of the flow passages of the second flow passage group individually between a state communicating with the second path and a state communicating with the third path, wherein the third switching valve and the fourth switching valve operate in conjunction with each other, when a third predetermined condition is satisfied, each of the flow passages of the second flow passage group communicates with either the second path or the third path to provide the heat transfer medium circuit including the second path and a heat transfer medium circuit including the third path which are independent from each other, and when a fourth predetermined condition is satisfied, each of the flow passages of the second flow passage group communicates with both the second path and the third path to provide a heat transfer medium circuit in which the second path communicates with the third path in series.

2. The vehicle heat management system according to claim 1, further comprising:

a second-path radiator disposed in the second path, wherein the heat transfer medium exchanges heat with outside air in the second-path radiator; and a third-path radiator disposed in the third path, wherein the heat transfer medium exchanges heat with outside air in the third-path radiator, wherein the third path includes a heat-transfer-medium flow passage provided in an engine of a vehicle, at least one of devices including: a heat-transfer-medium-cooling heat exchanger that cools the heat transfer medium by heat exchange between a low-pressure refrigerant of a refrigeration cycle and the heat transfer medium; a heat-transfer-medium-heating heat exchanger that heats the heat transfer medium by heat exchange between a high-pressure refrigerant of the refrigeration cycle and the heat transfer medium; an intake-air-cooling heat exchanger that cools intake air of the engine by heat exchange between the intake air and the heat transfer medium; a heat generator that generates heat; a first heat storage device that stores at least one of heat and cold; and a first air-heating heat exchanger that heats air blown into a vehicle interior by heat exchange between the blown air and the heat transfer medium, is disposed in the first flow passage group, and at least one of a plurality of devices including: an exhaust-gas heat exchanger in that the heat transfer medium exchanges heat with exhaust gas of the engine; an oil heat exchanger in that the heat transfer medium exchanges heat with oil; a second heat storage device that stores at least one of heat and cold; and a second air-heating heat exchanger that heats air blown into the vehicle interior by heat exchange between the blown air and the heat transfer medium, is disposed in the second flow passage group.

3. The vehicle heat management system according to claim 2, wherein the fourth predetermined condition is that the temperature of the heat transfer medium in the second path is higher than the temperature of the heat transfer medium in the third path, and the third predetermined condition is that the temperature of the heat transfer medium in the second path or the temperature of the heat transfer medium in the third path is higher than a predetermined temperature.

4. The vehicle heat management system according to claim 3, being used for a hybrid vehicle operating or stopping the engine in accordance with a state of charge of a battery supplying power to a vehicle-running electric motor, the vehicle heat management system further comprising:
- a first bypass flow passage through which the heat transfer medium flows to bypass the second-path radiator;
- a second bypass flow passage through which the heat transfer medium flows to bypass the third-path radiator;
- a second-path switching device that switches between a case in which the heat transfer medium flows through the second-path radiator and a case in which the heat transfer medium flows through the first bypass flow passage;
- a third-path switching device that switches between a case in which the heat transfer medium flows through the third-path radiator and a case in which the heat transfer medium flows through the second bypass flow passage; and
- a controller that switches the second-path switching device to make the heat transfer medium flow through the first bypass flow passage and switches the third-path switching device to make the heat transfer medium flow through the second bypass flow passage, when the temperature of the engine is lower than or equal to a predetermined temperature.

5. The vehicle heat management system according to claim 4, wherein
the controller estimates an engine start-up time at which the engine starts up on the basis of the state of charge of the battery, and determines a bypass switching time, at which the controller switches the second-path switching device to make the heat transfer medium flow through the first bypass flow passage and switches the third-path switching device to make the heat transfer medium flow through the second bypass flow passage, on the basis of time required to warm up the engine to a predetermined temperature and the engine start-up time.

6. The vehicle heat management system according to claim 2, wherein
the second predetermined condition is that it is estimated that an abnormality has occurred in the first pump or the second pump and that the temperature of the heat transfer medium in the first path is lower than a predetermined temperature.

7. The vehicle heat management system according to claim 2, wherein
the heat-medium-cooling heat exchanger is disposed in the first flow passage group, and
when it is estimated that frost adheres to one of the second-path radiator and the third-path radiator, the first switching valve, the second switching valve, the third switching valve and the fourth switching valve operate in conjunction with each other to make the other of the second-path radiator and the third-path radiator communicate with the heat-transfer-medium-cooling heat exchanger.

8. The vehicle heat management system according to claim 7, wherein
at least one of the first heat storage device and the heat generator is disposed in the first flow passage group, and
when it is estimated that the frost adheres to the one of the two radiators, the first switching valve, the second switching valve, the third switching valve and the fourth switching valve operate in conjunction with each other to make the one of the second-path radiator and the third-path radiator communicate with at least one of the first heat storage device and the heat generator.

9. The vehicle heat management system according to claim 2, wherein
the first heat storage device is disposed in the first flow passage group,
the oil heat exchanger is disposed in the second flow passage group, and
when the temperature of the heat transfer medium flowing in the first heat storage device is higher than or equal to the temperature of the oil flowing in the oil heat exchanger and is higher than or equal to a predetermined temperature, the first switching valve, the second switching valve, the third switching valve and the fourth switching valve operate in conjunction with each other to make the first heat storage device communicate with the oil heat exchanger.

10. The vehicle heat management system according to claim 9, wherein
the heat-medium-cooling heat exchanger and the heat-transfer-medium-heating heat exchanger are disposed in the first flow passage group, and
when the temperature of the heat transfer medium flowing in the first heat storage device is lower than the temperature of the oil flowing in the heat oil exchanger and is lower than a predetermined temperature, the first switching valve, the second switching valve, the third switching valve and the fourth switching valve operate in conjunction with each other to make the first heat storage device communicate with the heat-transfer-medium-cooling heat exchanger and to make the oil heat exchanger communicate with the heat-transfer-medium-heating heat exchanger.

11. The vehicle heat management system according to claim 9, wherein
when the temperature of the heat transfer medium flowing in the first heat storage device is higher than or equal to a predetermined temperature, the first switching valve, the second switching valve, the third switching valve and the fourth switching valve operate in conjunction with each other to make the first heat storage device communicate with the heat-transfer-medium-cooling heat exchanger and to make the heat-transfer-medium-heating heat exchanger communicate with the third path.

12. The vehicle heat management system according to claim 9, wherein
the first heat storage device includes a battery that stores heat and cold, and a battery heat exchanger in which the battery exchanges heat with the heat transfer medium.

13. The vehicle heat management system according to claim 2, wherein
the first heat storage device is disposed in the first flow passage group,
the oil heat exchanger is disposed in the second flow passage group,
the first heat storage device includes:
- a battery that stores heat and cold;
- an air blower that blows air in a vehicle interior;
- a casing that defines an air passage in which the air flows;
- a battery heat exchanger in which the battery exchanges heat with the heat transfer medium via air; and
- air flow switching devices that switch the flow of the air in the air passage, the battery and the battery heat exchanger are disposed in the air passage, an air outlet through which the air flowing in the air passage is discharged to the outside of the vehicle is provided on the casing, the air flow switching device switches the flow of the air between a first air flow state, in which the air flows through the battery heat exchanger, the battery and the air outlet in this order, and a second air flow state, in which the air flows through the battery, the battery heat exchanger and the air outlet in this order, and in a state where the battery heat exchanger and the oil heat exchanger communicate with each other, the air flow switching device switches the flow of the air to the second air flow state when the temperature of the battery is higher than the temperature of the air, or the air flow switching device switches the flow of the air to the first air flow state when the temperature of the battery is lower than the temperature of the air.

14. The vehicle heat management system according to claim 2, wherein the first heat storage device is disposed in the first flow passage group, the first heat storage device includes:
a battery that stores heat and cold;
an air blower that blows air in a vehicle interior;
a casing that defines an air passage in which the air flows;
a battery heat exchanger in which the battery exchanges heat with the heat transfer medium via air; and
an air flow switching device that switches the flow of the air in the air passage, the battery and the battery heat exchanger are disposed in the air passage, an air outlet through which the air flowing in the air passage is discharged to the outside of the vehicle is provided on the casing, the air flow switching device switches the flow of the air between a first air flow state, in which the air flows through the battery heat exchanger, the battery and the air outlet in this order, and a second air flow state, in which the air flows through the battery, the battery heat exchanger and the air outlet in this order, and in a case where the battery heat exchanger and the third path communicate with each other, the air flow switching device switches the flow of the air to the second air flow state when the temperature of the battery is higher than the temperature of the air, or the air flow switching device switches the flow of the air to the first air flow state when the temperature of the battery is lower than the temperature of the air.

15. The vehicle heat management system according to claim 2, wherein the first heat storage device is disposed in the first flow passage group, after the vehicle has stopped, the first switching valve, the second switching valve, the third switching valve and the fourth switching valve operate in conjunction with each other to make the first heat storage device communicate with a high-temperature device that has a temperature higher than the temperature of the first heat storage device among the devices disposed in the first flow passage group and the second flow passage group, and at least one of a plurality of pumps disposed in a path that communicates with the high-temperature device among the first path, the second path and the third path is operated until a temperature difference between the high-temperature device and the first heat storage device becomes smaller than or equal to a predetermined value, and when the vehicle again travels, the first switching valve, the second switching valve, the third switching valve and the fourth switching valve operate in conjunction with each other to make the first heat storage device communicate with a device that needs heat among the devices disposed in the first flow passage group and the second flow passage group.

16. The vehicle heat management system according to claim 15, wherein when a number of the high-temperature devices is plural after the vehicle has stopped, the first switching valve, the second switching valve, the third switching valve and the fourth switching valve operate in conjunction with each other to make the high-temperature devices communicate with the first heat storage device in turn) in order of temperature from low to high.

17. The vehicle heat management system according to claim 2, wherein the first heat storage device is disposed in the first flow passage group, after the vehicle has stopped, the first switching valve, the second switching valve, the third switching valve and the fourth switching valve operate in conjunction with each other to make the first heat storage device communicate with a low-temperature device that has a temperature lower than the temperature of the first heat storage device among the devices disposed in the first flow passage group and the second flow passage group, and at least one of a plurality of pumps disposed in a path that communicates with the low-temperature device among the first path, the second path and the third path is operated until a temperature difference between the low-temperature device and the first heat storage device is smaller than or equal to a predetermined value, and when the vehicle again travels, the first switching valve, the second switching valve, the third switching valve and the fourth switching valve operate in conjunction with each other to make the first heat storage device communicate with a device that needs cold among the devices disposed in the first flow passage group and the second flow passage group.

18. The vehicle heat management system according to claim 17, wherein when a number of the low-temperature devices is plural after the vehicle has stopped, the first switching valve, the second switching valve, the third switching valve and the fourth switching valve operate in conjunction with each other to make the low-temperature devices communicate with the first heat storage device in turns in order of temperature from high to low.

19. The vehicle heat management system according to claim 1, wherein the second predetermined condition is that it is estimated that an abnormality has occurred in the first pump or the second pump.

20. The vehicle heat management system according to claim 19, further comprising a controller that outputs an instruction to the first pump and the second pump to operate, wherein it is estimated that the abnormality has occurred in the first or second pump when the rotation speed of the first or second pump deviates from a predetermined range in response to the instruction output from the controller to each of the first pump and the second pump.

21. The vehicle heat management system according to claim 1, wherein
a second-path radiator, in which the heat transfer medium exchanges heat with outside air, is disposed in the second path, and
a second-flow-passage-group radiator, in which the heat transfer medium exchanges heat with the outside air, is disposed in one of the flow passages of the second flow passage group.

22. The vehicle heat management system according to claim 1, wherein
a second-flow-passage-group radiator, in which the heat transfer medium exchanges heat with outside air, is disposed in one of the flow passages of the second flow passage group, and
a third-path radiator, in which the heat transfer medium exchanges heat with the outside air, is disposed in the third path.

23. The vehicle heat management system according to claim 1, wherein
the second flow passage group includes three or more flow passages in which the heat transfer medium flows, and
second-flow-passage-group radiators, in which the heat transfer medium exchange heat with outside air, are disposed in two flow passages among the three or more flow passages of the second flow passage group, respectively.

24. The vehicle heat management system according to claim 1, wherein
a first-flow-passage-group radiator, in which the heat transfer medium exchanges heat with outside air, is disposed in one of the flow passages of the first flow passage group, and
a second-flow-passage-group radiator, in which the heat transfer medium exchanges heat with the outside air, is disposed in one of the flow passages of the second flow passage group.

25. The vehicle heat management system according to claim 1, wherein
the second flow passage group includes three or more flow passages in which the heat transfer medium flows,
a second-flow-passage-group radiator, in which the heat transfer medium exchanges heat with outside air, is disposed in one of the three or more flow passages of the second flow passage group,
another flow passage among the flow passages of the second flow passage group includes a heat-transfer-medium flow passage that is provided in an engine of a vehicle, and
a third-path radiator, in which the heat transfer medium exchanges heat with the outside air, is disposed in the third path.

26. A vehicle heat management system comprising:
a first pump and a second pump that suck a heat transfer medium and discharge the heat transfer medium;
a first path in which the heat transfer medium flows and the first pump is disposed;
a second path in which the heat transfer medium flows and the second pump is disposed;
a first flow passage group that includes flow passages in which the heat transfer medium flows;
a first switching valve to which an inlet side of the first path and an inlet side of the second path are connected in parallel and to which outlet sides of the flow passages of the first flow passage group are connected in parallel, wherein the first switching valve switches communication states of the flow passages of the first flow passage group individually between a state communicating with the first path and a state communicating with the second path; and
a second switching valve to which an outlet side of the first path and an outlet side of the second path are connected in parallel and to which inlet sides of the flow passages of the first flow passage group are connected in parallel, wherein the second switching valve switches communication states of the flow passages of the first flow passage group individually between a state communicating with the first path and a state communicating with the second path, wherein
the first switching valve and the second switching valve operate in conjunction with each other,
when a first predetermined condition is satisfied, each of the flow passages of the first flow passage group communicates with either the first path or the second path to provide a heat transfer medium circuit including the first path and a heat transfer medium circuit including the second path which are independent from each other,
when a second predetermined condition is satisfied, each of the flow passages of the first flow passage group communicates with both the first path and the second path to provide a heat transfer medium circuit in which the first path communicates with the second path in series; and
the second predetermined condition is that it is estimated that an abnormality has occurred in the first pump or the second pump.

* * * * *